United States Patent
Zornow et al.

(10) Patent No.: US 12,385,177 B2
(45) Date of Patent: Aug. 12, 2025

(54) SYSTEMS AND METHODS FOR AUTOMATED MANUFACTURING OF FLEXIBLE GOODS AND RELATED TECHNOLOGIES

(71) Applicant: Sewbo, Inc., Seattle, WA (US)

(72) Inventors: Jonathan Michael Zornow, Seattle, WA (US); Peter Pruyn Malarkey, Seattle, WA (US)

(73) Assignee: Sewbo, Inc., Seattle, WA (US)

( * ) Notice: Subject to any disclaimer, the term of this patent is extended or adjusted under 35 U.S.C. 154(b) by 0 days.

(21) Appl. No.: 18/507,787

(22) Filed: Nov. 13, 2023

(65) Prior Publication Data

US 2024/0076818 A1    Mar. 7, 2024

Related U.S. Application Data

(60) Division of application No. 16/503,210, filed on Jul. 3, 2019, now Pat. No. 11,814,766, which is a continuation of application No. PCT/US2018/012429, filed on Jan. 4, 2018.

(60) Provisional application No. 62/442,295, filed on Jan. 4, 2017, provisional application No. 62/590,932, filed on Nov. 27, 2017.

(51) Int. Cl.
    *D06C 29/00*    (2006.01)
(52) U.S. Cl.
    CPC .................................. *D06C 29/00* (2013.01)
(58) Field of Classification Search
    CPC ........ D06C 29/00; A41H 42/00; A41H 43/02; B32B 37/0038; B32B 37/20; B32B 38/06; B32B 2305/18; D06M 11/05; D06M 15/07; D06M 15/09; D06M 15/263; D06M 15/285; D06M 15/333; D06M 15/53; D06M 15/3562; D06B 19/00; D06H 1/00
    See application file for complete search history.

(56) References Cited

U.S. PATENT DOCUMENTS

| | | | |
|---|---|---|---|
| 2,209,238 A | 7/1940 | Sperber | |
| 2,516,487 A | 7/1950 | Schlicksupp | |
| 3,036,537 A | 5/1962 | Breier | |
| 3,708,466 A | 1/1973 | Kappler et al. | |
| 9,468,563 B2 | 10/2016 | Coe et al. | |
| 10,132,027 B2 * | 11/2018 | Zornow | D06B 15/00 |
| 2004/0062897 A1 | 4/2004 | Samii | |

(Continued)

FOREIGN PATENT DOCUMENTS

JP            05272048        10/1993

OTHER PUBLICATIONS

Locher, et al., "Design and Characterization of Purely Textile Patch Antennas," IEEE Transactions and Advanced Packaging vol. 29, No. 4, Nov. 2006, pp. 777-788.

*Primary Examiner* — Cynthia L Schaller
(74) *Attorney, Agent, or Firm* — DLA PIPER LLP (US)

(57) ABSTRACT

Systems and methods for automated manufacturing of flexible goods and related technologies are disclosed. A workpiece can be processed to temporarily change its physical properties for facilitating handling and assembly operations. The system can include one or more automated handling apparatuses for transporting workpieces between workstations. Each workstation can perform a different stage of the manufacturing process. After the goods have been manufactured, the goods can be processed such that is returns to its original physical properties.

7 Claims, 16 Drawing Sheets

(56) References Cited

U.S. PATENT DOCUMENTS

2009/0064424 A1 3/2009 Ide et al.
2014/0236199 A1 8/2014 Hadba et al.
2015/0330018 A1 11/2015 Zornow

* cited by examiner

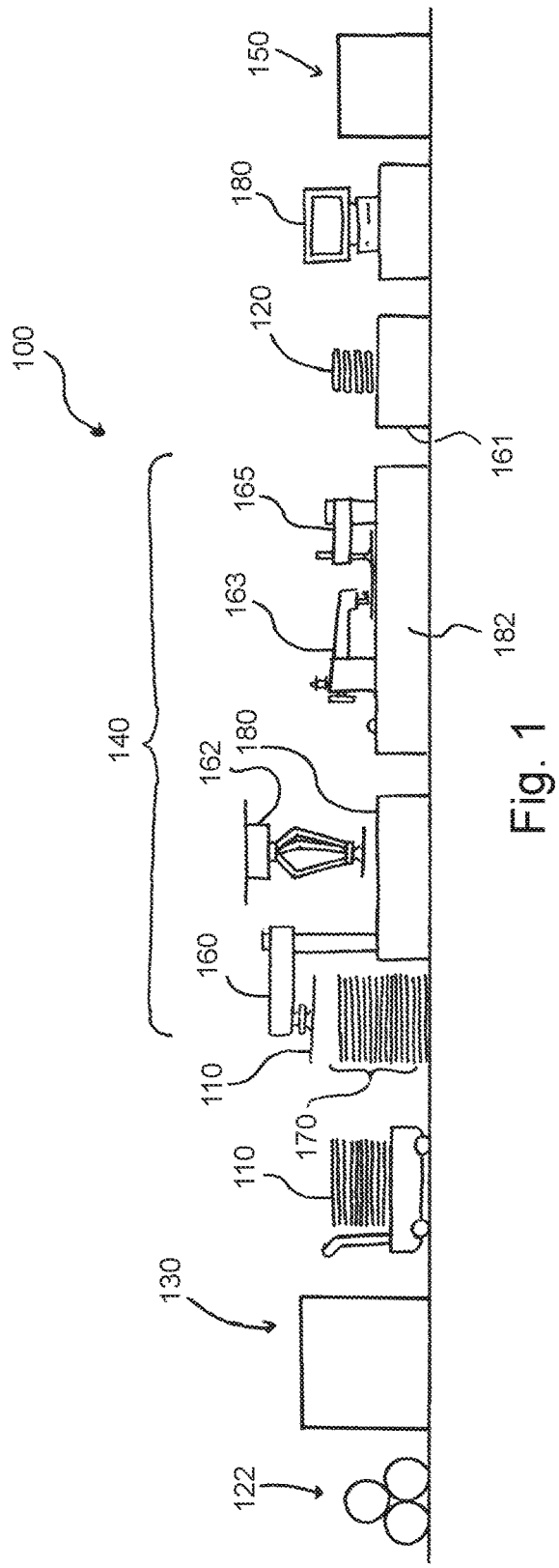
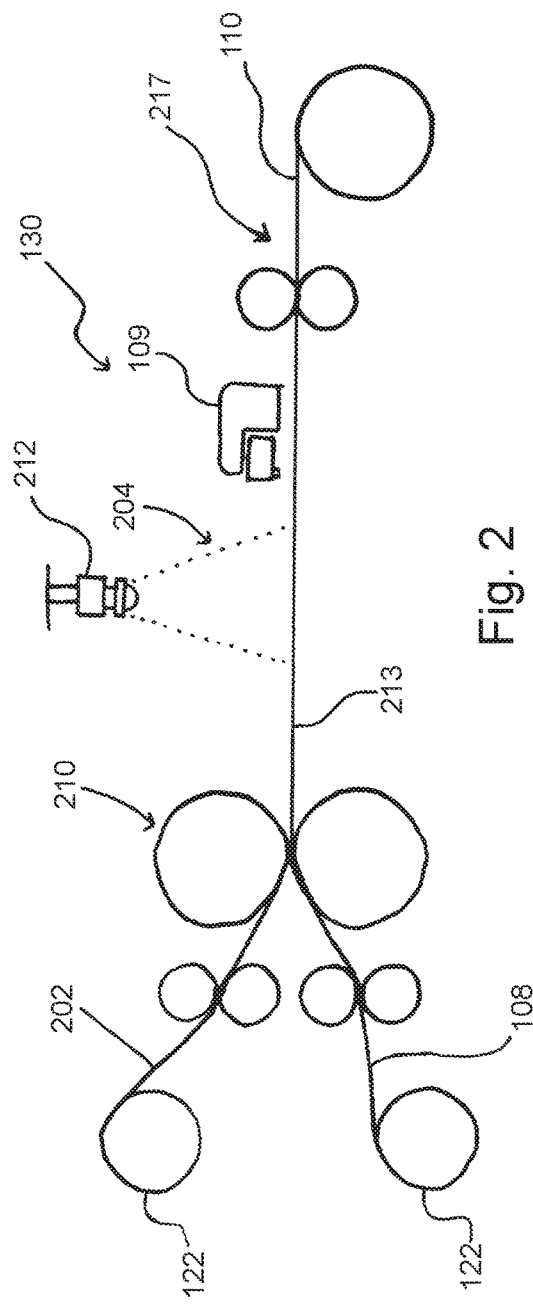

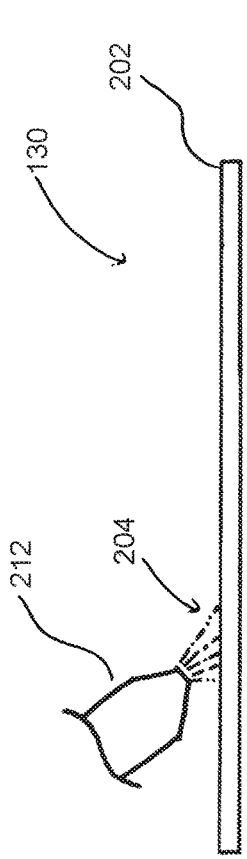
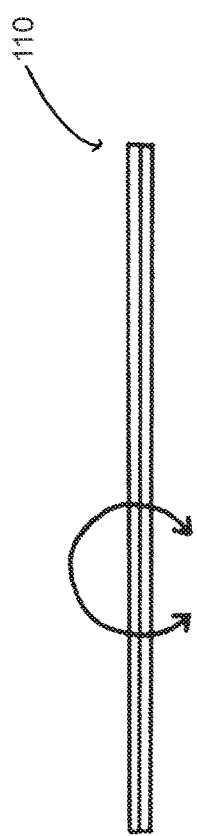
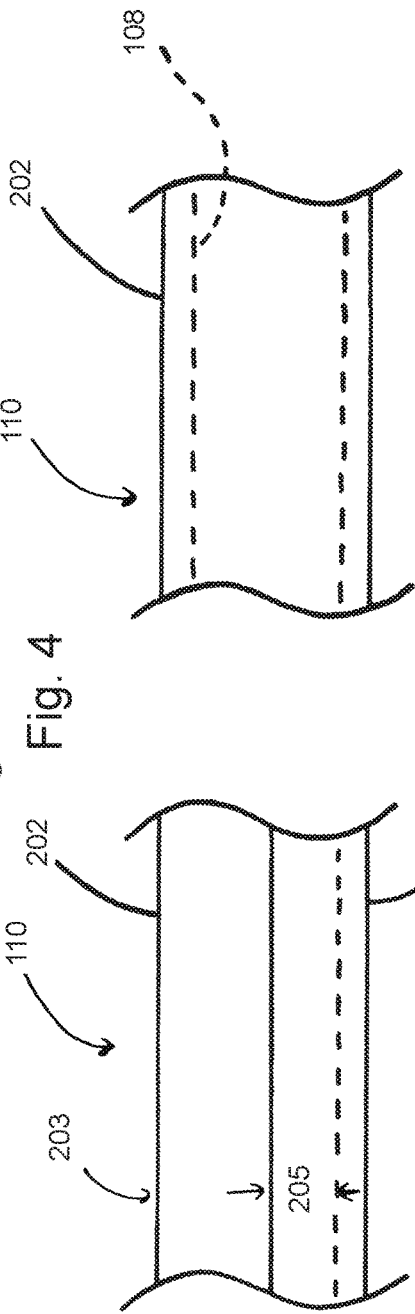
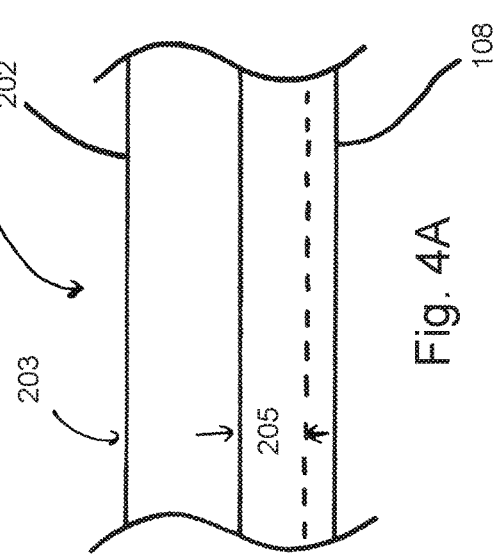

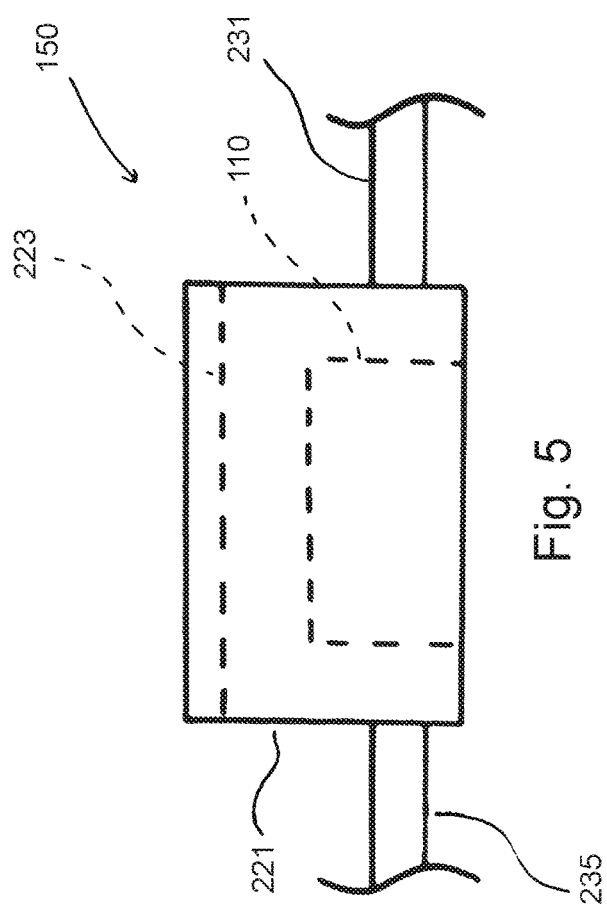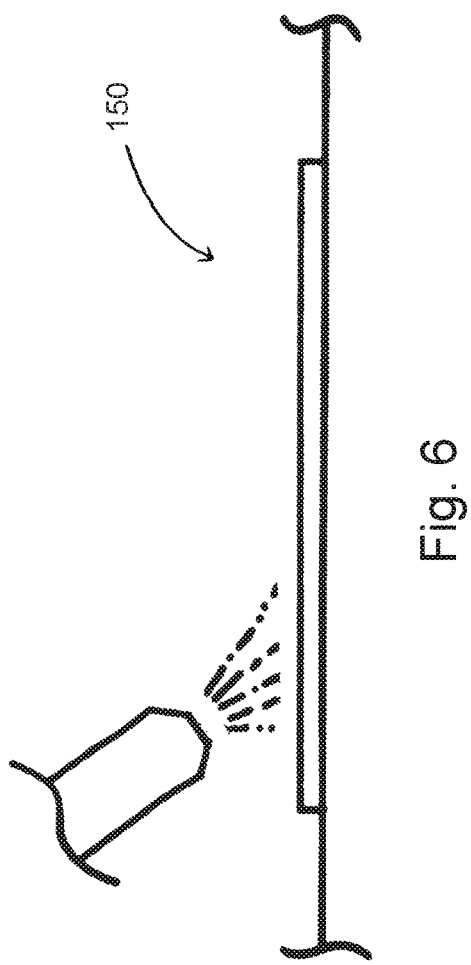

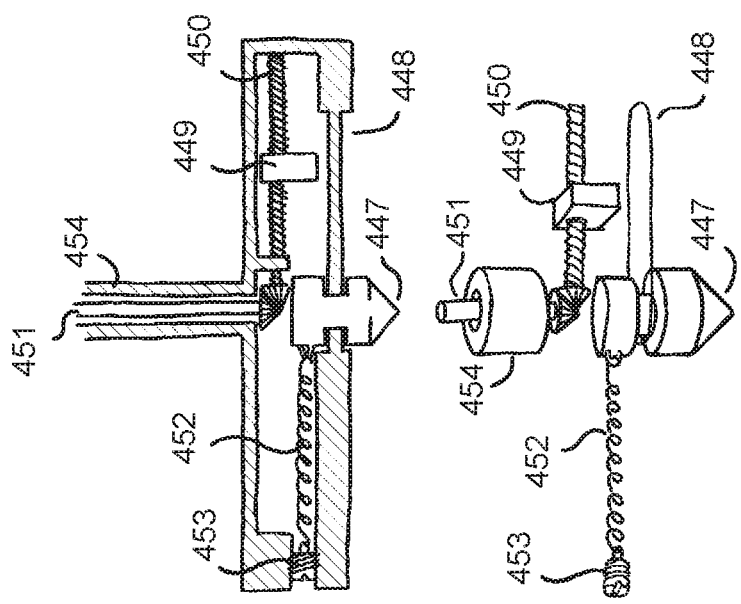
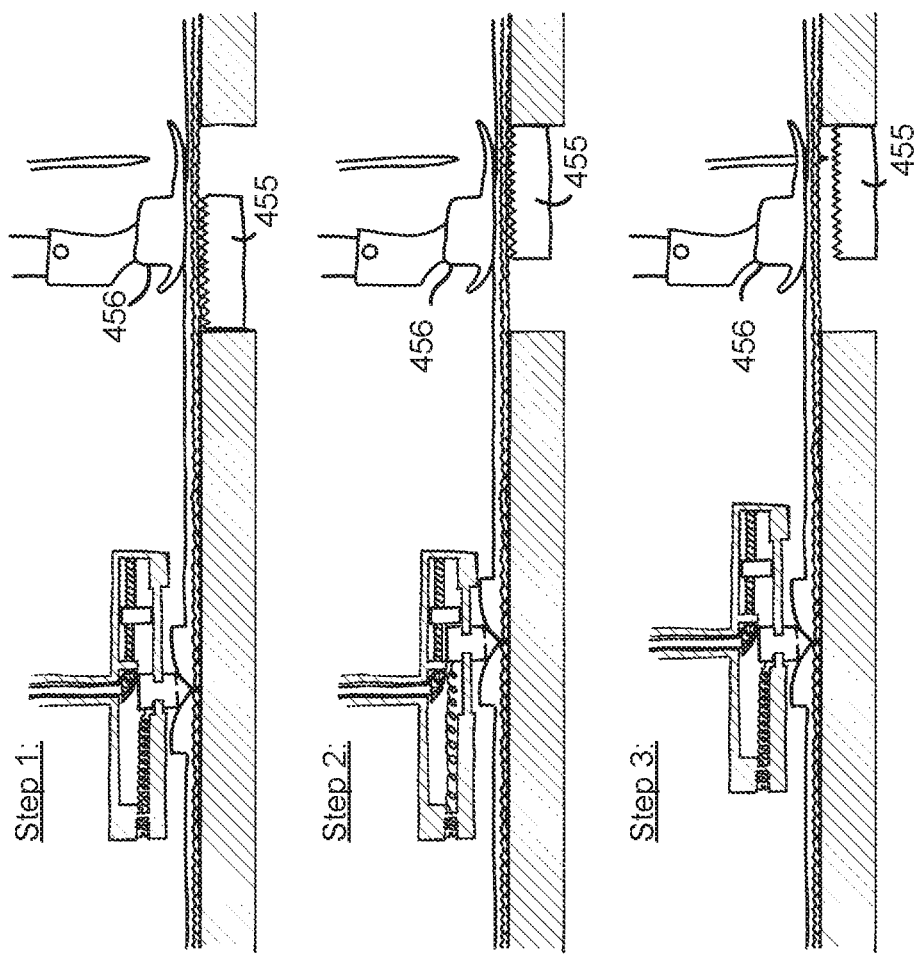
Fig. 15

SYSTEMS AND METHODS FOR AUTOMATED MANUFACTURING OF FLEXIBLE GOODS AND RELATED TECHNOLOGIES

CROSS-REFERENCE TO RELATED APPLICATIONS

This is a divisional of U.S. application Ser. No. 16/503,210, filed Jul. 3, 2019, which is a continuation of International Application No. PCT/US2018/012429, filed Jan. 4, 2018, which claims priority to U.S. Provisional Application No. 62/442,295, filed Jan. 4, 2017, and U.S. Provisional Application No. 62/590,932, filed Nov. 27, 2017, which are incorporated by reference in their entireties.

FIELD OF THE INVENTION

The present invention relates generally to the field of manufacturing flexible goods. In particular, the present disclosure relates to systems and methods for temporarily altering the physical characteristics of materials and to utilizing one or more automated systems to manufacture flexible goods from the materials.

BACKGROUND

Garment production often includes a significant amount of human interaction. Although there are numerous automatic processes for performing specific steps in garment production, like the cutting of components or the addition of buttons, button holes, pockets, etc., they all require human intervention at numerous steps along the way to facilitate the automatic processes. (Positioning the garment on a jig for a machine, for example.) This has left an unrealized opportunity for further efficiency in manufacturing. Additionally, flexible materials (e.g., textiles) present a challenge for mechanically aided manufacturing processes. For this reason, the industrial manufacture of any product that uses primarily flexible materials, like garment production, is currently dominated by laborers assembling the garments manually, with the help of machines for specific steps.

SUMMARY

Systems and methods for automated manufacturing of flexible goods and related technologies are disclosed herein. A workpiece can be processed to temporarily change its physical properties for facilitating handling and assembly operations. The system can include one or more automated handling apparatuses for transporting workpieces between workstations. Each workstation can perform a different stage of the manufacturing process. After the good has been manufactured, the good can be processed such that it is returned to its original physical properties.

The workpieces can be monolayer or multilayer substrates. In some embodiments, the workpiece can be a textile and thermoplastic-textile composite material that is temporarily applied to the textile to facilitate handling. The thermoplastic material can be removed after handling. In some embodiments, the thermoplastic material can be a posing agent that stiffens a drapable textile (e.g., fabric). For example, the posing agent can be a film that is laminated onto the textile. The composite material can be stiff enough to maintain a generally planar shape while the composite material is transported between various workstations.

Systems and methods for thermoplastic-textile composites can assist in the automated assembly of compliant sewn goods, such as apparel, and can have many other useful applications. Conventional forming methods often require manual manipulation and are otherwise cumbersome and inefficient. In comparison, stiffened workpieces may be more easily manipulated, assembled, transported, and otherwise processed. After completing a desired number of processing steps, the workpieces can be returned to their original properties. For example, a stiffener (e.g., a posing agent or posing film) can be applied to the workpieces. The stiffened workpieces can be cut, carried, assembled, and/or otherwise processed. In some embodiments, the stiffened workpieces can be pieces of stiffened fabric. The fabric can be sewn together to form a garment. The stiffener can then be removed without damaging the garment. In some procedures, the entire garment assembly process can be performed while all of the pieces remain stiffened. In other procedures, one or more workpieces (or portions of workpieces) can be left untreated or unstiffened before completion of the manufacturing process. A majority or substantially all of the remainder of the stiffener can be removed after completion of the garment. The process can be used to form other flexible goods, including tents, canopies, parachutes, coverings (e.g., automobile seat coverings), etc.

At least some embodiments are methods for manufacturing a garment. The methods include applying a solvent to a treatment film to partially dissolve the treatment film. The partially dissolved treatment film is applied to flexible material to form an altered material (e.g., stiffened material, rigid material, etc.). A garment can be formed from the altered material. In some embodiments, the entire garment (or substantially all of the garment) can be formed of altered material. After forming the garment, one or more solvents can be applied to the garment to remove the treatment film. For example, a water-based solvent can be applied to the garment to remove substantially all of the treatment film.

In some embodiments, a method for producing a garment includes applying a posing agent to a flexible material to temporarily stiffen the material. The stiffened material can be robotically positioned at a workstation. The stiffened material can be robotically coupled to another material (e.g., a stiffened or limp material). After robotically coupling the stiffened material, at least one solvent can be applied to the stiffened material to remove the posing agent.

In some further embodiments, a method for producing a product includes applying an agent (e.g., stiffening or posing agent) to a flexible material to stiffen the flexible material. The stiffened material can be positioned at a workstation configured to assemble pieces of stiffened material. After coupling together the stiffened pieces, a solvent is used to remove the agent. In certain embodiments, the workstation robotically couples together the pieces of material. For example, the workstation can robotically manufacture most of a garment (e.g., pants, a shirt, shorts, a dress, etc.) prior to removing the agent.

The pieces of material that are assembled together can include at least 30 wt % of posing agent, 40 wt % of posing agent, 50 wt % of posing agent, 60 wt % of posing agent, 70 wt % of posing agent, 90 wt % of posing agent, or 95 wt % of posing agent. The posing agent can be in a solid state to help enhance the rigidity of the material. A ratio of the bend stiffness of the stiffened material to a bend stiffness of the material prior to stiffening can be equal to or greater than about 5, about 10, about 20, about 30, about 50, about 60, about 70, about 80, about 90, or about 100. Other ratios can be achieved.

The starting material can be limp and drapable (e.g., flexible cotton fabric, polyester fabric, etc.) and the stiffened material can have characteristics similar to, for example, cardboard. The stiffened material can be manipulated while it maintains an unfolded configuration, generally planer configuration, or the like. Stiffened material can be incorporated into a garment having sufficient bending stiffness such that the stiffened material is capable of being held in a cantilever fashion by a robotic-end effector. The robotic end effector can have one or more vacuum cups, grippers, or other components.

A garment can comprise mostly of stiffened material by weight or area. In certain manufacturing procedures, a temporarily stiffened garment can comprise at least about 20 wt % of posing agent, about 30 wt % of posing agent, about 40 wt % of posing agent, about 50 wt % of posing agent, about 60 wt % of posing agent, about 70 wt % of posing agent, about 80 wt % of posing agent, or about 90 wt % of posing agent. The posing agent can be a water soluble thermoplastic. In one embodiment, the posing agent includes mostly polyvinyl alcohol by weight or volume.

In some embodiments, methods for manufacturing garments include applying one or more treatment films to a flexible material to form a stiffened material. The stiffened material can be robotically transported to a garment assembly workstation. The stiffened material can be robotically coupled to another piece of material to form at least a portion of a garment. Substantially all of the one or more treatment films can be removed from the garment. The stiffening process can increase the material's stiffness at least about 2×, about 5×, about 10×, about 20×, about 30×, about 40×, or about 50×, for example.

The stiffened material can be transported to a garment assembly workstation by one or more robotic arms, conveyors, or other robotic equipment. A sewing machine can couple the stiffened material to other materials, form seams, or the like. A robotic handler can manipulate the stiffened material to facilitate, for example, sewing, folding (e.g., folding of the stiffened material), hemming, or combinations thereof. Even though the stiffened material is rigid, a robotic-end effector can apply sufficient force to bend or fold the stiffened material.

In some further embodiments, a method for forming a garment can include applying a solvent to a treatment film. The treatment film can then be applied to a flexible textile to form a composite textile workpiece. At least some of the solvent is removed from the workpiece to stiffen the composite workpiece. In some procedures, substantially all of the liquid component of the solvent is removed to produce a dry composite textile workpiece. The solvent can be applied by spraying, rolling, dipping, or a combination thereof. For example, the solvent can be sprayed onto the treatment film. In some procedures, the solvent can be rolled onto the treatment film using a roller. In some procedures, the treatment film is dipped into a solvent bath. The composite textile workpiece can be heated to facilitate evaporation of the solvent.

In some embodiments, a system for manufacturing garments can include a preparation station that includes one or more dispensers that apply solvent to one or more stiffening treatment films to partially dissolve the stiffening treatment films. The preparation station can also be configured to apply the partially dissolved stiffening treatment films to a material to form a stiffened material. The system can further include a garment station configured to robotically manufacture a garment.

The preparation station can include rollers that cooperate to compress treatment films against flexible materials. The garment station can include sewing machines. The sewing machines can couple together stiffened materials with the help of robotic handling equipment. In some embodiments, workers can conveniently pick up and hold pieces of stiffened material.

In some embodiments, a temporarily stiffened garment includes one or more laminated textile pieces that are coupled together. Each textile piece can include a treatment film that has been applied to a flexible material (e.g., fabric, cloth, etc.). The treatment film can be removed from the textile pieces without damaging the flexible material. In some embodiments, the treatment films impregnate flexible materials.

The textile pieces can be coupled together via sewing, welding, fusing, and/or adhesive. The textile pieces can form a garment, a canopy, a tent, a parachute, or the like. A substantial portion or a majority of the garment can be stiffened by the treatment films. For example, at least about 50% of the garment can be stiffened by the treatment films. The garment can be assembled while the textile pieces are in a stiffened state. In some embodiments, at least about 60%, about 70%, about 80%, or about 90% of the assembled garment (by weight or volume) is stiffened. The treatment films can be removed without damaging the color or integrity of the garment. This allows the finished garment to have properties that are similar to handmade garments.

BRIEF DESCRIPTION OF THE DRAWINGS

FIG. 1 is an illustration of a system for manufacturing flexible goods in accordance with one embodiment of the disclosed technology.

FIG. 2 depicts a workpiece preparation station in accordance with one embodiment of the disclosed technology.

FIG. 3 depicts a workpiece preparation station for applying a film to a substrate in accordance with one embodiment of the disclosed technology.

FIG. 4 shows a stiffened workpiece in accordance with one embodiment of the disclosed technology.

FIG. 4A is a detailed view of a portion of the stiffened workpiece of FIG. 4 in accordance with an embodiment of the disclosed technology.

FIG. 4B is a detailed view of a portion of the stiffened workpiece of FIG. 4 in accordance with another embodiment of the disclosed technology.

FIG. 5 is a schematic view of a finishing workstation for processing goods in accordance with an embodiment of the disclosed technology.

FIG. 6 is a schematic view of a finishing workstation for processing goods in accordance with another embodiment of the disclosed technology.

FIG. 15 depicts a stitch length compliance mechanism in accordance with one embodiment of the disclosed technology.

DETAILED DESCRIPTION

Manufacturing Systems

Figure 7:
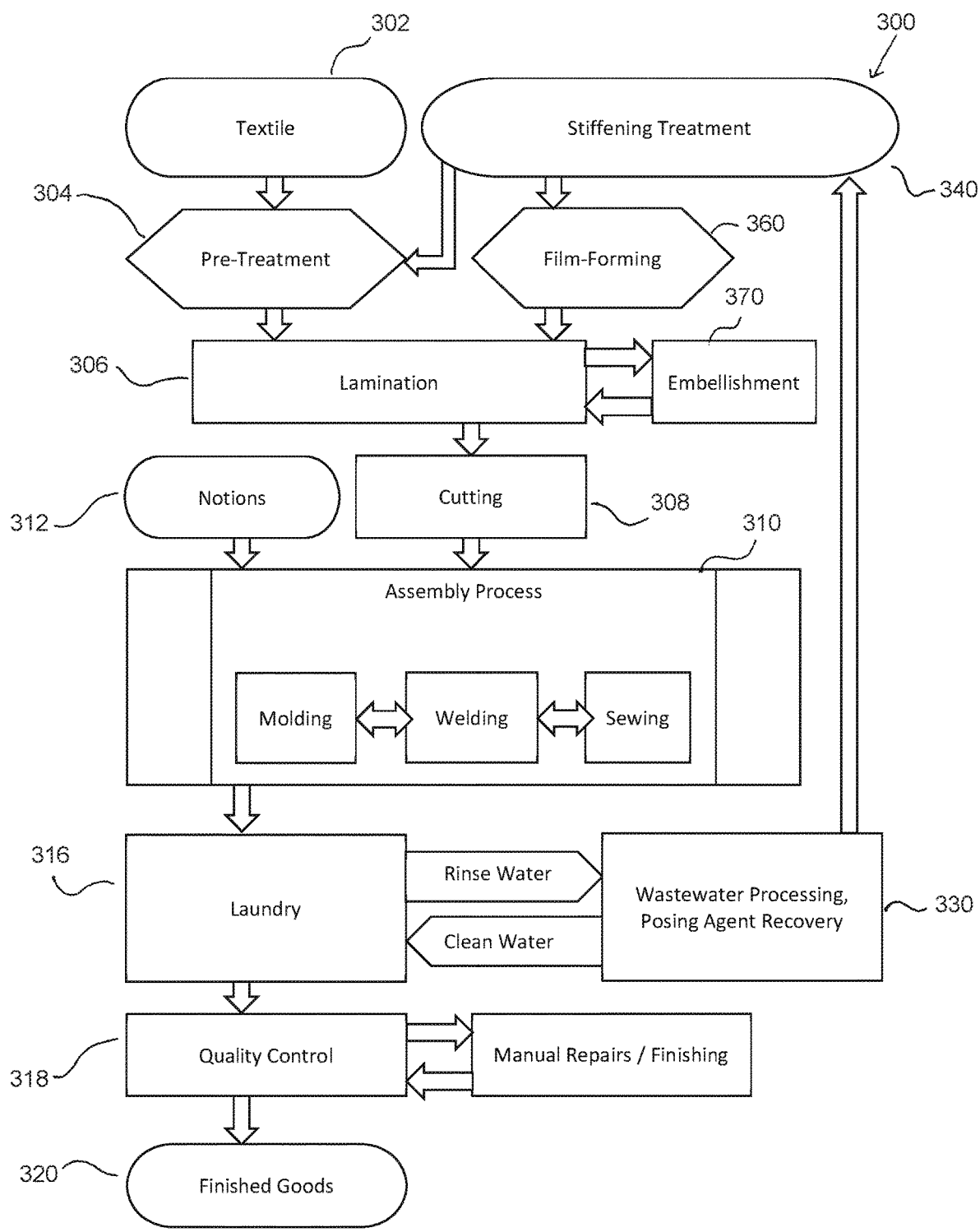
FIG. 7 is a flow chart illustrating a method for producing goods in accordance with one embodiment of the disclosed technology.

FIG. 1 is an illustration of a system 100 for manufacturing flexible goods in accordance with one embodiment of the disclosed technology. The system 100 can temporarily stiffen flexible workpieces 110 to facilitate handling of the workpieces. Automated manufacturing apparatuses can pick up and place the workpieces 110 at a variety of workstations without having workpieces fold upon themselves, so the system 100 can handle, cut, and/or assemble the workpieces 110 to produce goods 120. At workstations, workpieces can be cut, welded, sewn, or otherwise processed robotically due to their rigidity.

The workpieces 110 can be made of fabric (e.g., synthetic fabrics, natural fabrics, etc.), leather, or other materials suitable to produce goods. The workpieces 110 can be unstiffened without being damaged. The garments 120 can be shirts, pants, blouses, dresses, or jackets. For example, the system 100 can manufacture shirts in one production run and then manufacture dresses in another. This provides manufacturing flexibility. The system 100 can also be configured to manufacture flexible goods, including tents, canopies, parachutes, coverings (e.g., automobile seat coverings), etc.

The system 100 can include a preparation workstation 130, an assembly or garment producing workstation 140 ("garment producing workstation 140"), and a finishing workstation 150. The preparation station 130 can alter the physical properties of workpieces 110 by applying one or more materials to the workpieces 110. Starting material 122 can be fed to the preparation workstation 130.

The preparation station 130 can include one or more roller assemblies, robotic arms, conveyor systems, applicators (e.g., sprayers, rollers, or other apparatuses for applying material to each of the workpieces 110), dyers, heaters, or combinations thereof. In some embodiments, the preparation station 130 is a stiffening workstation that stiffens flexible or drapable material by impregnating or coating the workpieces with a stiffening material. The starting material 122 can be rolls of textiles. In other embodiments, the starting material 122 can be individual workpieces that can be individually or batch fed to the preparation station 130.

The preparation station 130 can produce stiffened workpieces such that the workpieces remain in a generally planar configuration during subsequent handling. For example, stiffening material can be applied to the starting material to produce composite workpieces, and the starting material can be a posing agent (including a posing film), thermoplastic material, or other material suitable for temporarily stiffening. Stiffening treatments can be applied to compliant materials using low-impact techniques. These techniques can be useful for preparing stiffened fabrics to facilitate the assembly of sewn goods and to avoid the hurdles faced by human operators and automated machinery when working with limp materials. Exemplary preparation stations 130 are discussed in connection with FIGS. 2 and 3.

The garment producing workstation 140 can include workpiece handling apparatuses 160, 162. In some embodiments, the handle apparatuses 160, 162 can be robotic arms with one or more end effectors for picking up and holding workpieces. In some embodiments, the handling apparatus 162 can pick up and carry finished goods 120 to a stacking station 161. In other embodiments, humans can retrieve the finished goods 120 from the workstation 150. The number, configuration, and position of the handling apparatuses can be selected based on the number the manufacturing steps to be performed. The garment producing workstation 140 can also include coupling devices (e.g., sewing machines, welding devices, or the like), positioners, imaging devices (e.g., cameras, optical sensors, etc.), sensors (e.g., contact sensors, proximity sensors, etc.), and other components useful for manufacturing goods.

The finishing workstation 150 can be configured to return the workpieces to their original properties and can include, without limitation, one or more baths, sprayers, rollers, or other equipment for removing material from stiffened workpieces. If a posing agent is used to stiffen the workpieces, rinsing solution can be applied to the workpieces to remove most or substantially all of the posing agent from the goods. In some embodiments, the goods 120 may not be a completed garment. For example, the goods 120 may be outer layers for jackets, and the goods can be assembled with other workpieces to produce completed jackets. Accordingly, the temporary stiffening may be for the entire assembly process or a portion thereof.

A controller 180 can control operation of the system 100 and can include one or more computers, handheld computing devices, or other computing devices. The controller 180 can exchange data components via electrical lines or, alternatively, via wireless or an optical communication links. The controller 180 can include one or more processors, Programmable Logic Controller, Distributed Control System, secure processors, or the like. Secure storage may also be implemented as a secure flash memory, secure serial EEPROM, secure field programmable gate array, or secure application-specific integrated circuit. The controller 180 can include an input/output device (e.g., a touch screen) that functions as both an input device and an output device. In alternative examples, the controller 180 may be include touch pads, keyboards, or the like used to command components, input data, or otherwise control the system 100 for automated manufacturing. The controller 180 can include memory, a computer-readable media drive, or memory slot that is configured to accept signal-bearing medium (e.g., computer-readable memory media, computer-readable recording media, or the like). In an embodiment, a program for causing a system to execute any of the disclosed methods can be stored on, for example, memory (e.g., RAM, ROM, etc.), a computer-readable recording medium (CRMM), a signal-bearing medium, or the like. Non-limiting examples of signal-bearing media include a recordable type medium such as a magnetic tape, floppy disk, a hard disk drive, a Compact Disc (CD), a Digital Video Disk (DVD), a digital tape, a computer memory, or the like. In some embodiments, each workstation can include a dedicated controller that communicates with other controllers to coordinate operation. The number, configuration, and operation of the controllers can be selected based on the configuration and functionality of the system 100.

The controller 180 can command the workstation 130 to apply one or more treatment films to a flexible material to form a stiffened material. The handling apparatus 160 can robotically transport the stiffened material to a garment assembly workstation 140. The workstation 140 can robotically couple the stiffened material to another piece of material to form at least a portion of a garment. Additional pieces can be assembled together. The controller 180 can command the workstation 150 to remove treatment films from the garment. In some embodiments, substantially all of one or more treatment films by weight are removed from the garment.

The stiffened workpieces can facilitate handling. Most of the stiffness of the stiffened material is attributable to the applied material (e.g., treatment film, posing agent, etc.). The composite workpiece can include at least about 50% applied material by weight, about 60% applied material by weight, about 70% applied material by weight, about 75% applied material by weight, about 80% applied material by weight, about 85% applied material by weight, about 90% applied material by weight, or about 95% applied material by weight. For example, the stiffening material can be about 50 wt. %, about 60 wt %, about 70 wt %, about 80 wt %, about 90 wt %, about 95 wt % calculated based on the weight of the dry composite workpiece. The weight percentage can be selected based on the desired characteristics of the composite workpiece. In some embodiments, the stiffening process can increase the stiffness of the material by about 50%, 100%, 200%, 500%, or more. The stiffness can be determined by determined according to ISO 5628.

A ratio of a bending stiffness of composite material to a bending stiffness of the flexible material prior to stiffening can be equal to or greater than about 5, about 10, about 20, about 50, or about 100. The bending stiffness of the composite material and the bending stiffness of the flexible material can be determined according to ISO 5628 or similar standard. In some embodiments, the flexible material can a drapable fabric that cannot maintain its shape under its own weight. Once stiffened, a fabric panel for forming a shirt or pants can be generally planar. The illustrated handling apparatus 160 is holding a stiffened fabric panel 110 picked up from a stack 170. The stiffened material incorporated into the garment can impart sufficient bending stiffness such that the garment capable of being held in a cantilevered fashion by the handling apparatus 160.

To produce goods, starting materials 122 can be loaded into the preparation station 130 and can be rolls of textiles or flexible material, stiffening materials (e.g., stiffening treatment film, fluid posing agent, etc.), sheets of textiles, or the like. The workpiece preparation station 130 can alter the properties of the flexible material to facilitate handling. In some embodiments, a stiffening treatment film is applied to a target substrate (e.g., a piece of textile, substrate, or other workpiece), and then the solvent is removed or allowed to evaporate, leaving a fixed bond between the stiffening treatment film and the flexible material. Together, the stiff treatment film and the flexible material to which it is bonded can form a thermoplastic composite workpiece suitable for use with the forming techniques disclosed herein. In some embodiments, the stiffening treatment film can be a water-soluble thermoplastic such as polyvinyl alcohol (or functional variations thereof) and the solvent can be water. A wide range of treatment-solvent combinations can be selected based on the characteristics of the flexible material (e.g., compatibility with the treatment-solvent), desired properties (e.g., workpiece rigidity, stretchability, breathability, absorbency, softness, stiffness, tear strength, etc.), or the like.

Flexible materials can receive stiffening treatments on one or both faces, with the stiffening treatment covering the entire work face, selected areas, or some combination of the two with varying levels of treatment. Treatment levels can vary by altering the amount of treatment or type of treatment material applied and/or characteristics (including thickness) of the stiffening treatment film. Treatment material can also be applied and then selectively removed. In some embodiments, different regions of the flexible materials undergo different treatments to produce a workpiece with varying characteristics. For example, different regions of the workpiece can have a different stiffness, stretchability, breathability, absorbency, softness, etc. During the assembly process, the characteristics of the workpieces can be altered. For example, after two workpieces are coupled together, additional posing material (e.g., a treatment film for application via a lamination process or posing agent for application via a spraying process) can be applied to the assembled workpieces or posing material can be removed from a region of the assembled workpieces.

Workpieces 110 (illustrated in the stack 170) can be located near the handling apparatus 160. The handling apparatus 160 can pick up and carry individual workpieces 110 and can then place the workpieces 110 at a processing station 180. The processing station 180 can include, without limitation, one or more cutters, coupling devices, sewing machines, positioners, sensors (e.g., optical sensors, positioning sensors, contact sensors, temperature sensors, etc.), imaging devices (e.g., cameras, video devices, etc.), or combinations thereof. In some embodiments, the processing station 180 can cut each workpiece 110 in multiple pieces. The individual pieces can be temporarily or permanently coupled together in the desired arrangement. Sewing machines 163 at workstation 182 can sew pieces together to form the garment. The handling apparatus 165 can manipulate (e.g., translate, rotate, etc.) workpieces for robotic sewing. The system 100 can robotically manufacture all or most of the garment 120 prior to removing the treatment agent. For example, a majority (e.g., at least 50%, 60%, 80%, 90%, or 95%) of the seams can be formed while the garment 120 remains stiffened. In another example, a majority of the pieces of the garment can be assembled while most of the pieces (or all of the pieces) are stiffened. For example, at least at least 50%, 60%, 80%, 90%, or 95% of pieces can be temporarily stiffened.

The finished garments 120 can be transported to the finishing workstation 150. The finishing workstation 150 can remove the material that temporarily stiffens the garments 120. In some embodiments, the finishing workstation 150 can remove substantially all of the stiffening material. Accordingly, the system 100 can automatically produce garments that have the same or similar characteristics as handmade garments.

FIG. 2 depicts the workpiece preparation station 130 in accordance with one embodiment of the disclosed technology. The forming techniques and systems disclosed herein can be particularly useful for producing thermoplastic composite workpieces, such as temporarily stiffened garments. Methods of forming and assembling composite workpieces are disclosed in commonly owned U.S. patent application Ser. No. 14/652,436, which is incorporated by reference herein in its entirety. In general, the preparation station 130 can apply a solvent 204 to a treatment film 202 to partially dissolve the treatment film. The partially dissolved treatment film can be applied to the flexible starting material 108 to form a stiffened material 110. The stiffened material 110 can be cut into desired pieces for producing garments.

The solvent 204 can be applied to the treatment film 202 or a material 108 (e.g., substrate such as a piece of textile), and then the solvent 204 is removed or allowed to evaporate so as to couple (e.g., bond, fuse, etc.) stiffening film to the substrate 108. A roller assembly 210 can compress the film 202 and a substrate 108 to form a multilayer workpiece 213. A dispenser 212 can apply the solvent 204 to the multilayer workpiece 213.

The dispenser 212 can include one or more sprayers, rollers, brushes, or other devices configured to controllably apply liquid solvent. In some embodiments, the dispenser 212 applies solvent to both the workpiece 110 and the film 202. In other embodiments, the dispenser 212 can apply solvent directly to the material 108. The film 202 can be applied to the saturated substrate 108. The solvent can be transferred to the film 202. Additionally, multiple solvents can be sequentially or concurrently applied to the film 202 and/or material 108.

FIG. 3 depicts the workpiece preparation station 130 in accordance with another embodiment of the disclosed technology. The dispenser 212 can apply solvent 204 to the film 202 and the film can be moved against the material 108. The film 202 and substrate 108 can be in the form of pre-cut sheets.

FIG. 4 shows the stiffened composite workpiece 110 in accordance with at least some embodiments of the disclosed technology. The workpiece 110 can include the stiffening film 202 and the substrate or material 108 ("substrate 108"). The stiffening material 202 can be a water-soluble stiffener. In some embodiments, the water-soluble stiffener comprises one or more thermoplastic materials, such as polyvinyl alcohol (or functional variations thereof). A solvent, such as water, can be used to wash out the thermoplastic material. A wide range of different stiffening materials and solvents can be used based on the treatment-solvent combinations. For example, the composition of the stiffener material can be selected based on the characteristics of the underlying substrate. A stiffener suitable for use with natural material (e.g., cotton) may not be suitable for synthetic materials. To produce a garment comprising different fabrics, different stiffeners can be used to achieve desired characteristics for each piece of the garment. A single or multistep stiffening process can be used to remove all of the stiffener materials. Workpieces can receive treatments on one or both faces, with the stiffening treatment covering the entire work face, selective areas, or some combination of the two with varying levels of treatment. Treatment levels can vary by altering the amount of treatment or type of treatment applied. Treatment material can also be applied and then selectively removed.

FIG. 4A is a detailed view of the workpiece 110 in accordance with one embodiment. The film 202 has impregnated the substrate 108 a distance 205. The distance 205 can be selected based on the dimensions of the film 202 and workpiece 108. The exposed surface 203 of the film 202 may be useful for handling the composite workpiece 110. For example, the surface may have a lack of breathability (e.g., impermeability to air) sufficient to pick up the composite workpiece 110 via a vacuum.

FIG. 4B is a detailed view of the workpiece 110 in accordance with another embodiment. The substrate 108 (illustrated in phantom line) is embedded in and impregnated by the film 202. The film 202 can protect opposite sides of the substrate 108.

Other types of composite workpieces can also be formed. Although the films 202 of FIGS. 4A and 4B are illustrated as a single layer, the films can have multiple layers. For example, one layer of the film 202 can be configured to impregnate the substrate 108, and another layer of the film 202 can protect the workpiece while also imparting substantial rigidity. The composition, number of layers, and number of films applied to substrates to produce workpieces can be selected based on the desired workpiece characteristics.

FIG. 5 is a schematic view of the finishing workstation 150 in accordance with one embodiment of the technology. The finishing workstation 150 can remove material (e.g., a treatment film, a posing agent, etc.) from a substrate and can include a container 221 with a solvent bath 223. The workpieces, goods, (e.g., a stack of goods) can be submerged in the bath 223 to wash away the stiffening material. The liquid of the bath can be selected based on the posing material. For example, the bath can be a water bath capable of washing away at least 60%, 70%, 80%, 90%, 95%, 99% by weight of the posing agent from the goods. In some embodiments, the solvent can be circulated or agitated to enhance posing material removal. In other embodiments, the finishing workstation 150 provides a flow of solvent for removing the posing material.

FIG. 6 is a schematic view of the finishing workstation 150 in accordance with another embodiment. The finishing workstation 150 can include one or more dispensers for applying a rinse (e.g., solvent). The dispensers can be sprayers, rollers, or other components for applying rinse to the goods. The flow rate and composition of the rinse can be selected based on the characteristics of the workpiece.

In closed-loop manufacturing systems, the rinsing material can be processed to separate the posing material from the rinsing material, which can be an energy-intensive process. Accordingly, the amount of solvent used to fully rinse the posing material from the substrate can be limited or minimized. Decreased solvent use in the finishing workstations can be effected by minimizing the amount of posing material applied to the substrate, selecting posing material with preferential solubility characteristics, selecting suitable solvents, and/or by modifying the removal process.

To minimize solvent usage, a sufficient amount of posing material can be selected to accomplish required tasks. The amount of posing material depends on the structural demands on the workpiece so, in general, larger pieces require both more posing material (e.g., more liquid posing agent or a thicker treatment film) to cover their larger area as well as thicker applications of posing material to impart more strength. Excess posing material can be eliminated to minimize solvent usage. If the posing material is applied in a batch process, it may be difficult to add specific amounts for each piece and, instead, the thickness will be determined by the largest piece and its minimum requirements. (For example, a treatment film with a thickness of about 100 μm, about 200 μm, or about 300 μm can be applied to each face of the substrate as a general-purpose treatment.) The posing material's characteristics can also be altered by using additives. For example, a posing agent's mechanical characteristics can be augmented by adding fibers or other composite-making materials into the posing material's matrix. Conditioners can be used to alter chemical characteristics of the posing material.

The posing material can be selected based on its structural and solubility characteristics, which can play a role in determining how much posing material is used and how much solvent or rinsing solution is used to remove the posing material. Posing material can be heterogeneous or homogenous. A homogenous posing material can comprise a blend of a thermoplastic material and starch. Thermoplasticity, initial tack, and flexibility can be provided by the thermoplastic component, whereas stiffness and improved rinse clearance will be provided by the starch component. The composition of the posing material can be selected based on the desired characteristics of the posing material. In some embodiments, the posing material can be about 25% to about 75% by weight or volume starch, about 35% to about 85% by weight or volume starch, or about 35% to about 90% by weight or volume starch. In some embodiments, the composition can be about 25% to about 75% by weight or volume thermoplastic, about 35% to about 85% by weight or volume thermoplastic, or about 35% to about 90% by weight or volume thermoplastic. In some embodiments, the starch concentration in the thermoplastic matrix may range from about 25-75% by weight or volume. In some embodiments, the composition includes at least about 15 wt % starch and/or at least about 15 wt % thermoplastic material. In some embodiments, the composition includes at least about 30 wt % starch and/or at least about 30 wt % thermoplastic material. In some embodiments, the composition includes at least about 50 wt % starch and/or at least about 50 wt % thermoplastic material. Higher concentrations of starch increase the risk of thermal damage during ultrasonic welding or thermal manipulations. This risk can be mitigated by applying multiple layers of posing material with varying concentrations of starch, with the lowest concentrations on the outermost layer or outer layers. Although some embodiments of the technology use water as a solvent because water may be the least expensive, least toxic, most easily access and utilized option, there are many other suitable solvents.

The method for removal of the posing agent, washing the assembled goods in a suitable solvent, is where all of these factors come together. Increased solvent temperature can lead to improved solubility. Care can be taken not to damage the underlying substrate with excessive temperatures or agitation. Exceeding the suitable temperature of a textile can cause issues with colorfastness/dye bleeding, or even damaging physical properties of the materials.

Rinsing can be staged in order to withdraw re-dissolved solids in the highest concentrations possible. This can make the re-processing of the stiffener more efficient, as water removal/polymer re-concentration is cumbersome and energy intensive. Concentrate from a rinse is retained for subsequent water reduction and re-incorporation into future stiffening batches. Alternatively, this can be accomplished using a continuous counter-flow tunnel washing system in the finishing workstation (e.g., workstation 150 of FIG. 1), in which the finished goods are moved against a stream of solvent so that they're first introduced to the most concentrated solvent and then, gradually, moved through to 'clean' solvent. For example, the finishing system 150 of FIG. 5 can deliver a stream of solvent via the input conduit 231. The solvent can flow through and around the goods contained in the chamber. The solvent/posing agent mixture can exit via the outlet conduit 235.

The rinsing process may be aided by the multiple-layer application method. By putting the most soluble posing agent layer on the inside, it will induce the less-soluble layer to slough off instead of needing to be fully dissolved away. The techniques discussed in connection with FIGS. 2 and 3 can apply more soluble posing agent layers internally via a multistep application process using sprayers, rollers, or the like.

FIG. 7 is a flow chart illustrating a method 300 for producing goods suitable for the system 100 of FIG. 1 or other systems disclosed herein. The method 300 can include contact techniques, non-contact techniques, tooled techniques, and parametric techniques. In some embodiments, a manufacturing system could be fully non-contact and parametric without sacrificing processing time or product quality. Technical and economic constraints can limit this from being realized, so systems can employ useful methods that span the spectra in both directions.

At block 302, a textile (or substrate) can be prepared and delivered to a pretreatment system. The textile can be cleaned, ironed, cut, and otherwise prepared for pretreatment.

At block 304, a pretreatment system or workstation can prepare the textile and/or film for contacting the solvent. The pretreatment system can include applying conditioners, additives, or other substances for enhancing interaction with the solvent.

At block 306, one or more solvents can be applied to the textile and/or film. In one embodiment, a solid film is applied to the textile via the lamination process. Other processes discussed herein, including processes discussed in connection with FIGS. 2 and 3, can be used.

At block 308 of FIG. 7, the textile can be cut into a desired shape. In some embodiments, an automated cutter cuts the textile based on a pattern or user input. In other embodiments, the textile can be cut manually using scissors, a knife, or the like. For example, the multi-layer workpiece 110 of FIG. 2 can be cut into pieces suitable for forming a garment.

At block 310, garments can be assembled via one or more molding processes, welding processes, sewing processes, or combinations thereof. For example, the workstation 140 of FIG. 1 can perform the assembly process. In some automated embodiments, the entire assembly process is performed robotically without human intervention. In other embodiments, portions of assembly process are performed robotically while other portions are performed manually. Automated forming often requires that workpieces be gripped by one or more robots, conveyor systems, clamping fixtures, vacuum boards, etc. The workpieces can be individual panels, knit/woven whole or cut from textile webbing, or multiple panels that have been joined with welding, stitching, adhesives, felting, stacking, crimping, etc.

In general, manufacturing can be achieved with one or more sequenced forming operations, in which workpieces are softened, manipulated, and cooled to lock in the changes. With this process, a flat piece can be formed into nearly any desired shape. The softening-hardening cycle can be most easily achieved through the application and removal of heat or a suitable solvent. This can include of a partial or full application and active or passive removal of heat or the solvent. Other scenarios include alteration of barometric pressure and/or the application/removal/modulation of acoustic, electric, magnetic, or electromagnetic fields. Thermal manipulation one suitable embodiment of this technique.

In some embodiments, notions 312 are provided. The notions can include patterns, user preferences, or the like that are used to mark, label, or otherwise prepare desired goods. In some embodiments, a batch of workpieces are processed to create substantial identical goods. In other embodiments, each piece of textile is processed differently to prepare customize goods. The notions can be used for individual or batch assembly processing at block 310.

At block 316, goods can be laundered to remove material (e.g., treatment film, posing agent, etc.), clean the goods, or the like. For example, a finishing station (e.g., finishing station 150 of FIG. 1, 5, or 6) can perform rinsing routines to, for example, wash out posing agent, treatment material, etc. from assembled garments.

At block 318, goods can be inspected for quality control. Automated inspection can be performed by analyzing still images, video, or other suitable inspection techniques. In other processes, non-automated inspection (e.g., visual inspection) can be performed by workers.

At block 320, finished good can be prepared for transport. Advantageously, most or substantially all of the treatment material used to facilitate handling during the assembly process can be removed to produce the finished goods. For example, at least 90%, 95%, 96%, 97, 98%, 99%, or 99.5% of the treatment material can be removed from the workpiece. Any residual treatment material (e.g., posing agent, treatment film, etc.) may not be identified upon a visual inspection. The finished goods may have the same material characteristics as handmade goods, but the automated good may have more consistent or tighter manufacturing tolerances. For example, robotically formed seams may be more consistent than handmade seams.

Processes can be performed to recover stiffening material. At block 330, effluent can be processed to recover the stiffening material. If the effluent is rinsing water, the posing agent can be removed from the water, and the clean water (identified in FIG. 7) can be used for the laundering process. Because other liquids can be used to launder the goods, the recovery process can be selected based on the characteristics of the rinsing liquid.

After block 330, the recovered stiffening material can be reused at block 340. At block 340, recovered stiffening material can be filtered, thermally processed, and/or chemically processed. The stiffening material can be formed into or incorporated into a posing film. The posing film can be used in the lamination process at block 306. In other embodiments, the posing agent can be a liquid form and applied to the substrate without performing the step at block 360.

At block 370, an embellishment process can be performed. The embellishment process can include adding visual features to the laminated textile to facilitate handling, enhance its visual appearance, or the like. The embellishment can include adding visual or mechanical markings so a workman or camera-guided robot can accurately position it, adding a magnetically responsive material to aid in grasping by magnetic fields, by rendering the material less permeable to gasses or fluids for manipulation by pneumatic, vacuum or hydraulic methods, by altering the density of a material, or—in what will probably be the most useful application—by altering the rigidity of the material so that it can be mechanically formed and manipulated.

Automated forming can minimize touch-time, as well as controlling costs and quality of assembled goods. Although the processes described herein can be used by and with automated systems, many of the technologies disclosed herein can be effected manually as well. In some embodiments, a combination of automated manufacturing and manual manufacturing can be used to produce items. For example, individuals can operate the machine 163 of FIG. 1. Although the method 300 is discussed with respect to stiffening materials, solvents in the form of water, and other specific processes (e.g., lamination at block 306), the method 300 can be performed to impart temporary characteristics to other workpieces (e.g., textiles). The altered characteristics can include, without limitation, rigidity, strength, absorbency, breathability, stretchability, stain resistance, or combinations thereof.

Figure 8:
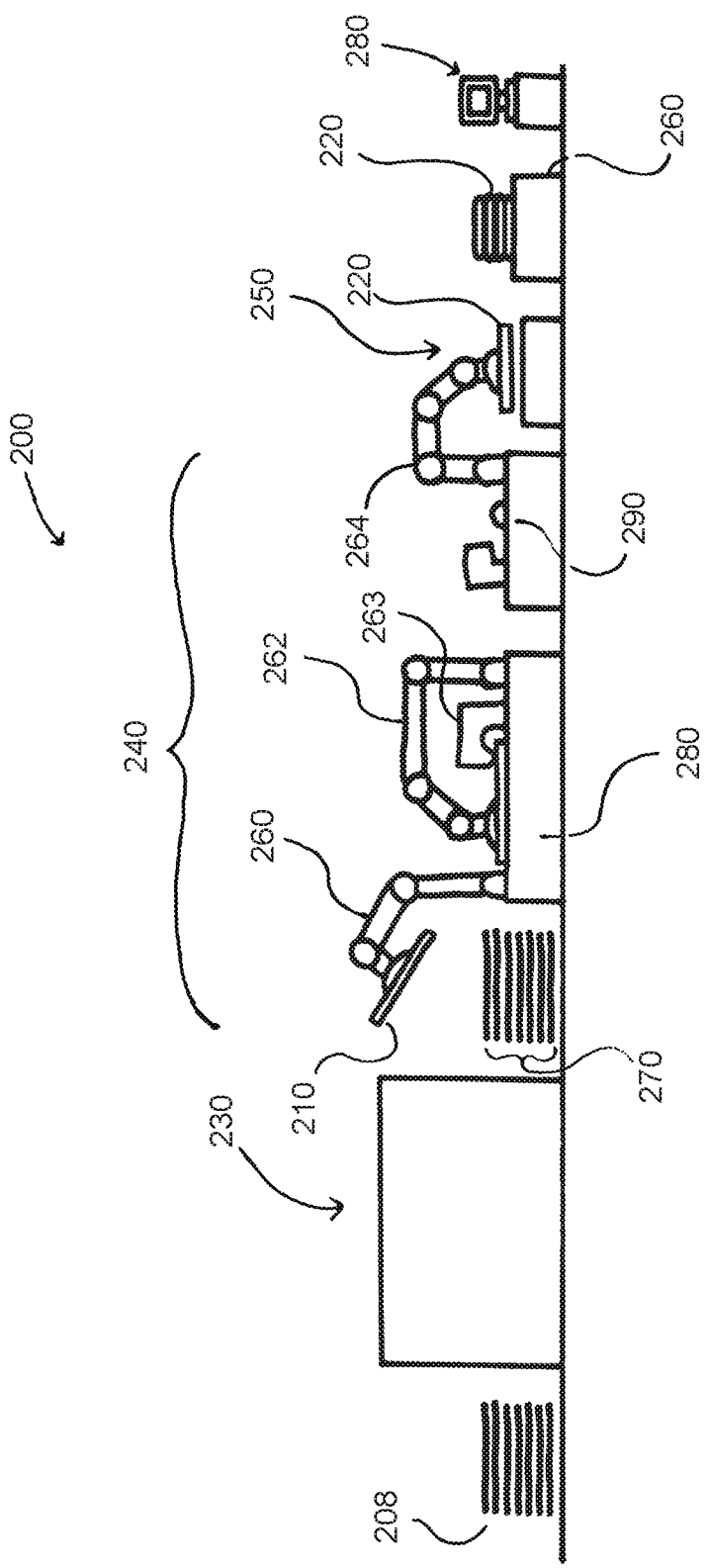
FIG. 8 is an illustration of a system for manufacturing flexible goods in accordance with another embodiment of the disclosed technology.

FIG. 8 is an illustration of a system 200 for manufacturing flexible goods in accordance with another embodiment of the disclosed technology. The description of the system 100 of FIG. 1 applies equally to the system 200 unless indicated otherwise. The system 200 can temporarily stiffen workpieces 210 to produce garments 220. The system 200 includes a preparation station 230, a goods or garment producing workstation 240 ("garment producing workstation 240"), and a finishing workstation 250.

The garment producing workstation 240 can include workpiece handling apparatuses 260, 262, 264. Each handling apparatus 260, 262, 264 can include one or more robotic arms that can have any number of degrees of freedom. The handling apparatuses 260, 262, 264 can cooperate to pick up, carry, rotate, place, or otherwise manipulate objects (e.g., starting materials 208). The handling apparatus 260 can retrieve a workpiece 210 from a stack 270 and can place the workpiece 210 at a station 280 for welding, sewing, etc. The handling apparatus 262 can transport workpieces between the station 280 and the station 290. For example, the workpieces can be transported after forming seams using the sewing machine 263. In some embodiments, the handling apparatuses 260, 264 can be robotic arms. In other embodiments, the handling apparatus 260 can be a robotic arm and the handling apparatus 264 can include a conveyor system and a pick and place robot.

The system 200 can performing thermal manipulation, contact physical manipulation, non-contact physical manipulation, or combinations thereof. The illustrated handling apparatuses 260, 262, 264 are well suited for contact manipulation and can include vacuum cups, grippers, or combinations thereof. In other embodiments, the handling apparatuses can have thermal end effectors for thermal manipulation. Such end effectors can include thermal elements, such as heaters, electrodes (e.g., RF electrodes), or the like. In other embodiments, the handling apparatuses 260, 262, 264 can be configured for non-contact physical manipulation and can include other end effectors (e.g., blowers). The other systems, workstations, and components can also be configured to perform thermal manipulation, contact physical manipulation, non-contact physical manipulation, or combinations thereof. Thermal manipulation, contact physical manipulation, and non-contact physical manipulation are discussed in detail below.

Thermal Manipulation

Thermal manipulation can be an important tool for working with workpieces, including workpieces comprising thermoplastics and thermoplastic composites. Thermal energy can be transferred via conduction, convection, and/or radiation. In conduction embodiments, heater elements (e.g., resistive heaters) can make contact with the materials. The heater elements can be integrated into workstations or handling apparatuses. In convection embodiments, a fluid (e.g., a gas such as hot air) can be directed against the workpiece. In radiation embodiments, blackbodies, infrared heaters, and/or laser sources directed by reflectors, galvanometers, DLP technology, and/or controlled by active and/or passive masking. The configuration and number of the convection elements and/or radiation elements can be selected based on the thermal manipulation to be performed.

The workpieces can be heated using RF energy. The RF energy can be directed via individual antennae or waveguides as well as static or parametric arrays. Magnetic energy can be imparted by permanent and/or electro-magnets. Either approach may benefit from the addition of susceptors (e.g., magnetic susceptors, dielectric susceptors, etc.) to the stiffening treatment.

Mechanical motion can heat workpieces locally. Energy can also be imparted through friction via motion (such as a needle through a composite material, or the composite material against a rough surface), stir welding, or transmitted ultrasonically through the composite medium.

Directed energy can take the form of a line, point source, complex mask, or parametrically defined heat map. Many of these heating elements can be stationary or moving, and standalone or integrated into other components—like a roller or folder.

Thermal energy can be removed several different ways. Thermal energy can be conducted away by an actively or passively cooled surface, by conduction through the unheated sections of the workpiece, by passive radiation, or carried away by a working medium, such as air. The working medium can also be compressed in advance and allowed to expand endothermically against the heated surface, cooling it faster.

Contact Physical Manipulation

The systems can perform contact or physical manipulation. Once heat has been imparted to soften the workpiece, the workpiece can be manipulated using contact or non-contact forming techniques, or both. Workpieces can also be physically manipulated at other times.

The contact can be physical interaction between workpieces (e.g., thermoplastic or thermoplastic-composite workpieces) and forming equipment. Contact manipulation can occur by passing workpieces through robotic arms, tooling, moving tooling on static work pieces, or combinations thereof. A workpiece can be held by robot gripping effectors, or moved by feeding mechanisms, such as gripped rollers, sewing machine feed mechanisms (e.g., pressing feet and feed dogs), or the like.

Two or more feeding mechanisms, either the same type or different, can be used in conjunction with thermal manipulation to parametrically impart and/or adjust (e.g., apply, increase, or decrease) tension in the textile substrate. For example, the feeding mechanism can include a plurality of gripping rollers moving at different speeds, or two robot arms gripping the workpiece in two locations and moving relative to each other. The gripping rollers of FIG. 2 on opposite sides of the dispenser 212 can rotate at different speeds. The handling apparatuses 260, 262 of FIG. 8 can tension workpieces.

The moving or static workpiece can also be manipulated by tooling, such as a folding/binding attachment, roll forming dies, stamping tool and dies, press brakes, and English wheels. Sewing tooling, sheet metalworking tooling, and other tooling can be used.

In some embodiments, continuous sheets of material are moved continuously or periodically through workstations in which they are printed, embossed, and/or cut before being rapidly and precisely formed via a series of processors, including cutting tools, folding surfaces, creasing and/or crimping rollers, or the like. For textile workpieces, this can also include the addition of stitching, permanent ultrasonic welding, fusible interfacing, etc. For temporary composite goods this can also include the addition of temporary welds on the treated surfaces, and can employ one or more of the thermal manipulation methods. After or during forming, pieces can be separated from each other and scrap materials, and removed as either as completed goods or works in progress on their way to subsequent assembly operations.

Workstations can be configured to perform roll forming techniques. Roll forming techniques are useful in many applications, particularly when preparing edges and/or seams. Seams can be formed by one or more heated, cooled, or ambient-temperature rollers to flatten them down or impart any desired angle or profile to the work piece in one to three dimensions. Roll forming tools can be used independently or in conjunction with one or more of the previously mentioned softening techniques.

In addition to tool-and-die molding methods, systems can be configured to perform vacuum forming techniques. Individual workpieces or multiple workpieces, either partially or fully separated from each other and the webbing from the roll of material they were cut from, are placed over a mold, heated to soften, and then drawn down over the mold by applying a pressure differential. A similar concept could be employed with electric or magnetic fields used as an attracting force.

Composite materials can also be formed unaided by placing them over a mold, heating them, and allowing gravity to pull the softened faced down to the mold.

Either of the previously mentioned techniques can be used with active molds, such as work surfaced with articulated panels, or forms that are actuated via mechanical, hydraulic, pneumatic, magnetic, and/or electrostatic means.

Non-Contact Physical Manipulation

Non-contact manipulation can be performed to limit or minimize the amount of tooling required to perform an operation. Some steps can be performed without a dedicated tool, and some operations can be performed without any tooling at all.

In some embodiments, it may be sufficient to precisely heat the workpiece and allow the weight of the material to pull the piece into shape. Alternatively, the workpieces can be rapidly moved through the air, so that inertia and air resistance force softened faces into place.

Another non-contact method is directing airflow—heated, cooled, or at room temperature—towards the workpiece at a high enough flow rate to impart sufficient force. It is also possible to exert force with acoustic energy via ultrasonic arrays capable of generating ultrasonic signals that are constructively interfered to create midair physical interactions for users. Midair interactions can also be used to manipulate and form softened work pieces.

Additionally, tension in the textile substrates can be exploited via the selective application of heat to the composite workpiece. Composites can be "pre-stressed" by imparting tension on the substrate during treatment or by softening existing composite, applying tension, and then cooling the workpiece. Once stressed, the composite can be induced to re-form into a desired shape by adding a controlled amount of heat at a controlled rate. For example, heating a strip of a flat, pre-stressed piece of composite on only one of its two treated faces will cause it to curl inwards along the dominant axis of the heated area. This effect occurs as the textile fibers in softened areas are constricted by their internal tension while the hardened areas resist this motion.

This approach can be used in conjunction with added temporary structural components. Additional layers of soluble polymer that have been cut, molded, or 3d-formed (e.g., 3d-printed onto the workpiece). The structural components can lock into place when formed correctly and can be used for self-assembly applications with non-soluble materials. A structure can be adhered to—or printed directly onto—tensed textiles that are held by a frame. Once the structure is in place, the frame can be released and a tensegrity structure springs up from a previously flat piece.

Polymer Paring

A posing agent (e.g., thermoplastic material) can be removed or displaced to alter characteristics, including stitching or seam characteristics. This can be accomplished by one or more of the following ways:
  Paring—a machine for paring (e.g., paring machines similar to ones used to prepare leather seams) can be used to remove (e.g., shave) layers of polymer off the work piece.
  A textured or smooth crimping tool or stamp, either heated or working on previously-heated composite, pressing the thermoplastic away from selected locations to add stitch holes for subsequent sewing operations and/or smooth seams for joints.
  A smooth tool—either heated or working on heated material—can also be used to displace plastic away from a seam area.
  Laser ablation can be used to selectively etch polymer layers away.
  Waterjet rinsing can be used to clear polymer away.

The above components can be incorporated into the workstations (e.g., workstation 140 of FIG. 1) to remove material from seams or other locations during or after applying stitching or seams. Most of the stiffening material (by weight or volume) can remain in the workpiece. In some embodiments, stiffening material (e.g., treatment films) can be removed from a location for a seam. Additional material can be selectively removed from the workpieces at different times.

Alternatively, a posing film (e.g., a polymer or treatment layer) can be partially or fully dissolved by a suitable solvent and/or pressed, promoting a higher surface area/lower-strength stiffening treatment. This lower-strength configuration may have preferable sewing characteristics for certain steps.

Sensors and Feedback

Automated and semi-automated workstations can use a variety of sensors to provide feedback for closed-loop controllers, ensuring that work pieces are accurately formed. The workstations disclosed herein can include sensors, feedback devices, and machine vision components.

Sensors can be physical switches or optical 'trip line' sensors for detecting the edge of a work piece in one or two dimensions. Sensors can also be considerably more complex, like ultrasonic distance sensors, 3d scanners, or force sensors on gripping effectors, tooling, or work surfaces. For example, the workstation 180 of FIG. 1 can have one or more sensors for tracking the movement and position of the workpieces before, during, and/or after sewing. The apparatus 162 of FIG. 1 can have sensors for identifying, inspecting, or otherwise obtaining information about workpieces.

Machine vision can be used to inspect the workpiece and provide feedback about the position of the material and its formed status. Machine vision can be used to study the entire work cell or tight, close-up views of the material.

Machine vision can be utilized using one or more cameras detecting light in the visible spectrum and/or in the near- and/or far-infrared ranges for thermal feedback. Thermal detection can also be achieved with single-pixel passive infrared sensors or contact sensors, like thermocouples. Such systems may also be integrated into other camera-based imaging systems, both passive imaging systems as well as those that project light to better scan surfaces. Sensors such as these can be incorporated into closed-loop control systems with heat sources to achieve precise thermal control of a target area on a workpiece. For example, a laser can be used to selectively soften a thin line along where a workpiece will be bent. The laser is applied to a desired bend axis until the material's detected temperature, determined via a camera or other sensor, has exceeded a predetermined threshold. At this point, the workpiece is manipulated, then is allowed to rest—either with or without a cooling tool, until the detected temperature at the seam has fallen below a predetermined threshold when rigidity has been restored and the workpiece can be safely released without deforming under its own weight.

Solvent/Polymer Approach

A low-impact lamination method can prepare stiffened workpieces and may have advantageous over adhesive-based laminations which employ an adhesive (e.g., a permanent glue) to bond layers or high-temperature laminations, whereby the treatment film is heated to a molten state and applied to a substrate—approaches that are unsuitable for temporary stiffening and/or incompatible with many temperature-sensitive textiles, dyes, and finishing treatments. Instead, the low-impact lamination approach utilizes solvents to fuse of films or sintering of powders, partially dissolving and re-solidifying stiffening materials, a much lower-temperature treatment method.

One method for low-temperature application comprises a soluble treatment and suitable solvent. One embodiment of this technique is demonstrated with water-soluble thermoplastics—specifically polyvinyl alcohol, or functional variations thereof—and water, but the concept is applicable to a wide range of treatment/solvent combinations.

A water-soluble polymer can be in water, or mildly acidic or alkaline water. Many suitable water-soluble polymers are also soluble in a range of other organic and polar solvents, many of which are suitable in this application. Example soluble polymers can include:
  Alkali-Soluble Polyvinyl Acetate Copolymers
  Ethylene vinyl acetate copolymers
  Ethylene-Maleic Anhydride copolymers
  Hydroxyethylcellulose
  Hydroxypropylcellulose (Brand name, "Klucel")
  Methylcellulose
  Methylethylcellulose
  Poly-2-ethyloxazoline ethyloxazoline (Brand name, "Aquazol")
  Polyacrylamide
  Polyacrylamide Polyacrylates
Polyethylene glycol
Polyoxyethylene (polyethylene glycol)
Polyvinyl alcohols and copolymers
Polyvinyl methyl ether
Polyvinyl Pyrrolidone
Polyvinyl Pyrrolidone
Sodium carboxymethylcellulose
Styrene-Maleic Anhydride Copolymers Other examples of suitable treatment/solvent pairs include:
- ABS in methyl ethyl ketone (also known as Butanone)
- ABS, polyethylene, polypropylene, polystyrene, Polycarbonate, Polymethylpentene (TPX) in Tetrachloroethylene (also known as, Perchloroethylene/PCE—a common dry-cleaning agent)
- Polylactic Acid (PLA) in methylene chloride (Dichloromethane), Tetrahydrofuran
- Polystyrene and acetates in acetone Other embodiments can include a combination of any of the previously mentioned treatments with each other or blended and may include a soluble starch. Blends can be formulated to trade-off and/or optimize cost, solubility, structural, and thermoplastic characteristics. Blends can also be formulated for compatibility with specific substrates.

Other combinations of solvent and stiffening material are suitable so long as the solvent can fully dissolve the stiffening treatment without permanently affecting the substrate or its dyes due to either chemical or thermal interactions.

Those skilled in the state of the art will appreciate that, in certain embodiments, this approach to the lamination process is relatively straightforward. The soluble film can be treated with a suitable solvent, applied to a substrate (e.g., textile, fabric, etc.), and the solvent is removed or allowed to evaporate leaving a permanent bond between treatment material and substrate. The substrate may also be treated with the solvent to improve bonding.

For ease of use, the treatment layer can be acquired or prepared as a film in advance of application using any suitable method, such as film casting or blow-molding. A suitable solvent is applied to the treatment film as a spray of droplets, or as a vapor that can condense on the stiffening treatment or adsorb into it. It can also be applied via a drum as a thin film of solvent or combination of aqueous/dissolved posing agent.

Depending on application method, one must allow enough time for partial absorption/dissolution/gelling/swelling of the posing agent to exhibit its adhesive properties. This process can be modulated by varying the temperature of the solvent. In such cases, care may be taken to ensure that the solvent only partially permeates the treatment, so that only the substrate-adjacent portions of the treatment exhibit adhesive properties, and the treatment doesn't inadvertently adhere to tooling.

The partially dissolved treatment film is then applied to the textile substrate by bringing the two in contact with each other. The substrate can also be moistened in advance with the solvent or a solution of the treatment and solvent. The two can be pressed together to improve the strength of the intended bond. Methods and systems for bringing the film and substrate into contact can be similar to those described in U.S. patent application Ser. No. 14/652,436, which is hereby incorporated by reference in its entirety.

The treatments described above can be used to apply one or more layers to one or more faces of the substrate (e.g., a textile, flexible sheet, etc.). If the treatment film is a polymer and it was formed with its constituent molecules aligned in one or more directions, it may be desirable to apply the layers such that the grain of a second layer has a specific orientation with respect to the previous layer.

Complex Applications

Although materials are described as two planes coming together for the sake of simplicity and ease of visualization, the methods disclosed herein apply to other shapes. Tube knits, for example, could be accommodated by either winding the treatment helically/coaxially around the substrate or coextruding it and/or blow molding it around the knit as both are formed. In some embodiments, the tube may be flattened and stiffening treatment material can be applied to the tubes generally flat faces. The workstations discussed herein can be configured to flatten the tube and then apply the treatment material.

Even more complex structures can be accommodated. Complex structures can be parametric knitting of complex shapes, and the techniques can accommodate knits, nonwoven forms, and any other type of complex object. The textile object (as an individually woven piece or a collection of web-joined pieces) is placed or knitted over a form, either a static object or one actuated with mechanic, pneumatic, hydraulic, electrostatic, or magnetic effects. The stiffening treatment, in sheet or blown tubular form, is placed over the object and mold, either before or after softening. An outside mold can be closed and/or a pressure differential may be applied, using air or other working fluids, pressing the treatment layer securely against the surface of the object. Optionally the internal mold is inflated to assist imparting the desired form to the object.

Alternative Methods

Another method includes applying treatment powder or flakes onto the substrate before compressing them and/or heating to sinter them together. Soluble polymers can be employ a suitable solvent, applied and driven off, to affect the treatment. Some materials can be sintered without a solvent, for example using only heat and/or pressure—particularly crystalline treatment materials, such as waxes, water ice, dry ice, or the like.

Soluble treatments can be partially or fully dissolved in advance, extruded as gel, poured or drum-applied as liquid, and/or gel and induced to dry. The soluble treatments can be useful in closed-loop applications, where the posing agent and/or removal solvent are recovered for reuse, as it allows one to bypass the fully-drying/film-forming/lamination stages and proceed directly from concentrator to finished product.

Room-temperature thermoplastic films can be bonded to substrates using ultrasonic or stir-friction welding, heating just the boundary layer between the treatment and substrate. For example, the film 202 of FIG. 2 can be a thermoplastic film that is welded to the substrate 108 by a welding apparatus 109.

Polymer treatment films can be finished with a textured surface—either hook-and-loop style snares to grip the threads, or micro- and nano-scale gecko-skin-inspired structures that exploit Van-der-Waals forces for adhesion. Other functional nanostructures could include those that impart hydrophobic and hydrophilic properties to treated surfaces.

Aqueous or gelled stiffening treatments can be applied to solid/dry films and substrates as sprays, extruded thin films, or thin films applied by a roller and used to adhere the faces. This can be done with or without accompanying drying aids like those discussed earlier.

When working with impermeable substrates stiffened by a treatment material, the stiffening treatment may not be satisfactorily removed from the inside of folded-over and/or sewn-shut seams. Perforations can be added to the impermeable surface to allow the stiffening treatment to escape (e.g., its envelope, seams, etc.). This can be performed with mechanical cutting or stamping tools, perforating needles, lasers, waterjets, etc. The preparation stations disclosed herein can include such components.

Tension

Both treatment materials and substrates can be held in tension to ensure a continuous interface for their joining. This typically involves removing any slack, but in some cases it may be desirable to impart additional tension to the substrate in one or two dimensions, so that the final product has 'pre-stressed' properties that can be exploited for structural stability or other manipulation techniques.

For some applications this can be accomplished using rollers, low-friction surfaces, and other commonly used fabric handling techniques. For continuous processes, tension can be imparted along the processing axis (i.e., the direction of motion of the material during processing) by running rollers for one portion of the line faster than the feed rate. For example, the film and substrate of FIG. 2 can be tensioned using the roller assembly with pinch rollers.

Tension can be imparted orthogonally to the processing axis using stenting techniques and equipment, which use mechanical gripping elements to pull or let slack the substrate material. This process can be incorporated into existing stenting operations. Any imparted substrate tension must be factored into downstream dimensional stability considerations.

Pressure Considerations

A platen pressure can be adjusted because, in some circumstances, higher pressure can improve bond strength. Additionally, greater textile compression leads to better stitching quality and composite strength. However, too much pressure can damage the substrate and reverse or damage previous finishing treatments and/or material properties such as pile height, napping, hand feel, etc. In some embodiments, the platen pressure can be measured automatically and can be input to a feedback system that adjusts the pressure applied to maintain the platen pressure within a desired range.

Thermal Considerations

When workpieces are formed via the solvent-lamination process, the solvent can be driven off or allowed to evaporate to form the desired high-strength bond. Solvent can be removed without negatively affecting component materials. Heat and vapor/air pressure should be set with this in mind, temperatures can be high enough to drive off solvent in a desired length of time (e.g., 5 secs, 10 secs, 30 secs, 1 minute, 2 minutes, or 5 minutes), but low enough to avoid any impact on the substrate, as well as hydrolysis or pyrolysis of posing agent.

Practicality necessitates that treatment times can be measured on the order of seconds or minutes. To process material as quickly as possible, the limiting factor may be the thermal sensitivity of the treatment material and substrate. Maximum temperatures can be selected based on the recommended thermal processing (e.g., ironing temperatures or safe temperatures) for the substrate textiles. For example:

Acetate: 143° C. (290° F.)
Acrylic: 135° C. (275° F.)
Cotton: 204° C. (400° F.)
Linen: 230° C. (445° F.)
Lycra/Spandex: 135° C. (275° F.)
Nylon: 135° C. (275° F.)
Polyester: 148° C. (300° F.)
Silk: 148° C. (300° F.)
Triacetate: 200° C. (390° F.)
Viscose/Rayon: 190° C. (375° F.)
Wool: 148° C. (300° F.)

In practice, the maximum temperature (e.g., maximum safe temperature) may be affected by the specific dyeing and finishing treatments that the textiles have undergone. As these are all above the boiling point of the one example solvent (e.g., water), as well as most other solvent options, it is possible to have a range of operating temperatures. For substrates with high temperature tolerances, improved lamination characteristics can still be achieved by heating the treatment to its melting point before or during application. In this scenario, the limiting factor may then become the thermal limits (e.g., pyrolysis temperatures, boiling temperatures, etc.) for the stiffening material, rather than that of the substrate.

Thermal energy can be imparted via conduction—contact with a heated surface or heated gasses directed across the material. It can also be applied via radiation from a blackbody or targeted from a laser source towards the interface/intersection between the two planes. Additionally, RF can be used to selectively target solvents, such as microwaves and water.

Manufacturing Techniques

The methods disclosed herein can provide autonomous mass production of garments and can be used for other applications in the production of a wide range of goods made, in whole or in part, of flexible material. The methods can be used to produce garments, sailboats' sails, luggage, camping tents, kites, upholstered furniture, or the like.

The techniques can also be used to manufacture precursor components for composite materials that require a woven substrate/component, such as resin-impregnated carbon fiber or fiberglass. Elements of the method can be useful at any scale of production, from by-hand application to computer controlled rapid prototyping to continuous full-scale, fully autonomous industrial production.

With the goal of manipulating and altering the flexible material in to facilitate handling, this process can include of taking the flexible material and imbuing it with temporary attributes thus constituting a working material to aid in manufacturing.

Enhancements made to the materials' properties can include adding visual or mechanical markings so a robot (e.g., a workman or camera-guided robot) can accurately position workpieces, adding a magnetically responsive material to aid in grasping by magnetic fields, by rendering the material less permeable to gasses or fluids for manipulation by pneumatic, vacuum or hydraulic methods, by altering the density of a material, or—in what will probably be the most useful application—by altering the rigidity of the material so that it can be mechanically formed and manipulated.

The material can be made temporarily rigid by the addition of a treatment material, alerting of the environmental variables in which the material is processed, or any combination of the two. The treatment material can be a posing agent, posing film (e.g., thermoplastic film, etc.), or other material that can be temporarily applied to the substrate. The treatment material can be applied to the textile to facilitate subsequent assembly steps. The treatment material can be selected based on one or more of the following criteria:

Chemical inert—the treatment material can be chemically inert when it's placed in direct, prolonged contact to the substrate—even under heat and pressure—and not cause any deleterious effects to the goods being assembled, or the machinery and/or workers doing the assembling. In some embodiments, the treatment material can be contact a textile to form a garment without causing permanent changes to the textile.

Bonding characteristics—the treatment material can be temporarily bondable to the textile and can be removed without damaging the textile substrate. For example, the treatment material can be easily mechanically separable, or be soluble in a material that does not affect or interact with the textile substrate Mechanical characteristics—the treatment material can be pliable and position-able—either by the application of direct pressure in significant excess of the normal force of gravity and reasonable handling forces, or by the application and subsequent removal of heat, solvent, electric fields or magnetic fields. It must be able to withstand as many reforming states as the assembly process requires without significant degradation Recovery/Recyclable—the treatment material can be recoverable and/or recyclable, or barring that as disposable as possible—requiring as few steps, and as little energy, as possible to render safe for disposal Exemplary Posing Agents A wide range of materials can be used as posing agent. In one embodiment, the posing agent comprises water, and the temperature of water can be used to method to control its mechanical properties. A textile can be soaked in water, frozen, manipulated by a machine, partially headed along an intended bend line, bent, refrozen, and so on. The water can eventually be removed at the end of the manufacturing process by, for example, evaporation.

In other embodiments, the posing agent can be a water-soluble material (e.g., table salt or starch). The textile can be treated with a high concentration solution of either of these materials, and be allowed to dry and stiffen. The textile would then be treated along a bend line with a small amount of appropriate solvent (e.g., water), and allowed or encouraged to re-harden. The posing agent would be removed at the end of assembly by rinsing with a suitable solvent, such as water.

Another exemplary posing agent is a thermoplastic material configured to melt at or near room temperature. The posing agent can be organic or inorganic waxes and natural and synthetic polymers with a desired melt temperature. The posing agent could be applied to the textile, and then heated slightly and softened along the bend lines. After assembly, the posing agent can be removed (e.g., washed away) using water and surfactant, a suitable solvent, or combinations thereof.

The property of a posing agent is a degree of permanent pliability at room temperature—giving the ability to deform a piece and have it stay that way. For example, a thin sheet of metal foil, coated with an adhesive and bonded to the textile, would serve this purpose. It could be molded and manipulated, and removed via electrolytic or chemical dissolution after assembly. The adhesive bonding the metal and textile would also have to be removed via solvent.

In addition to the practical posing agents discussed thus far, there are also a number of less practical, but still conceivably applicable, materials that might be considered for this role: Ferrofluids, which respond to magnetic fields, could be used to coat the textile. Alternately, a rheopectic or dilatant non-Newtonian fluid, like cornstarch and water, whose viscosity is increased dramatically by the application of mechanical stress, could be applied and then locked into shape by the application of mechanical forces or an acoustic field, and allow a formed garment piece to retain its shape for, or at least limit the degree of deformation during, a short period of time.

Polyvinyl Alcohol

The posing agent can be polyvinyl alcohol because it is a water-soluble thermoplastic available in industrial quantities. Further to its merit for the role, it can be fully recovered at the end of the manufacturing process and reused in subsequent processes.

For the sake of simplifying the discussion, embodiments will be described employing polyvinyl alcohol as the stiffening agent. For steps that require that the bonded posing agent and textile be formed, the polyvinyl alcohol can be heated, formed, and passively or actively cooled. For other materials, their corresponding process for manipulation can be used instead.

Agent Application

The agent can be applied from a roll as a film and laminated onto the surface of the textile or deposited as a liquid, in molten state or in solution, directly onto the textile. The advantage of using a premade film is that its manufacture is separated from the subsequent assembly steps, and does not need to be synchronized with overall operation scheduling, textile feed speeds or variable cutting rates, and can be applied and almost immediately used, avoiding a delay for cooling from molten state or solvent evaporation.

Figure 9:
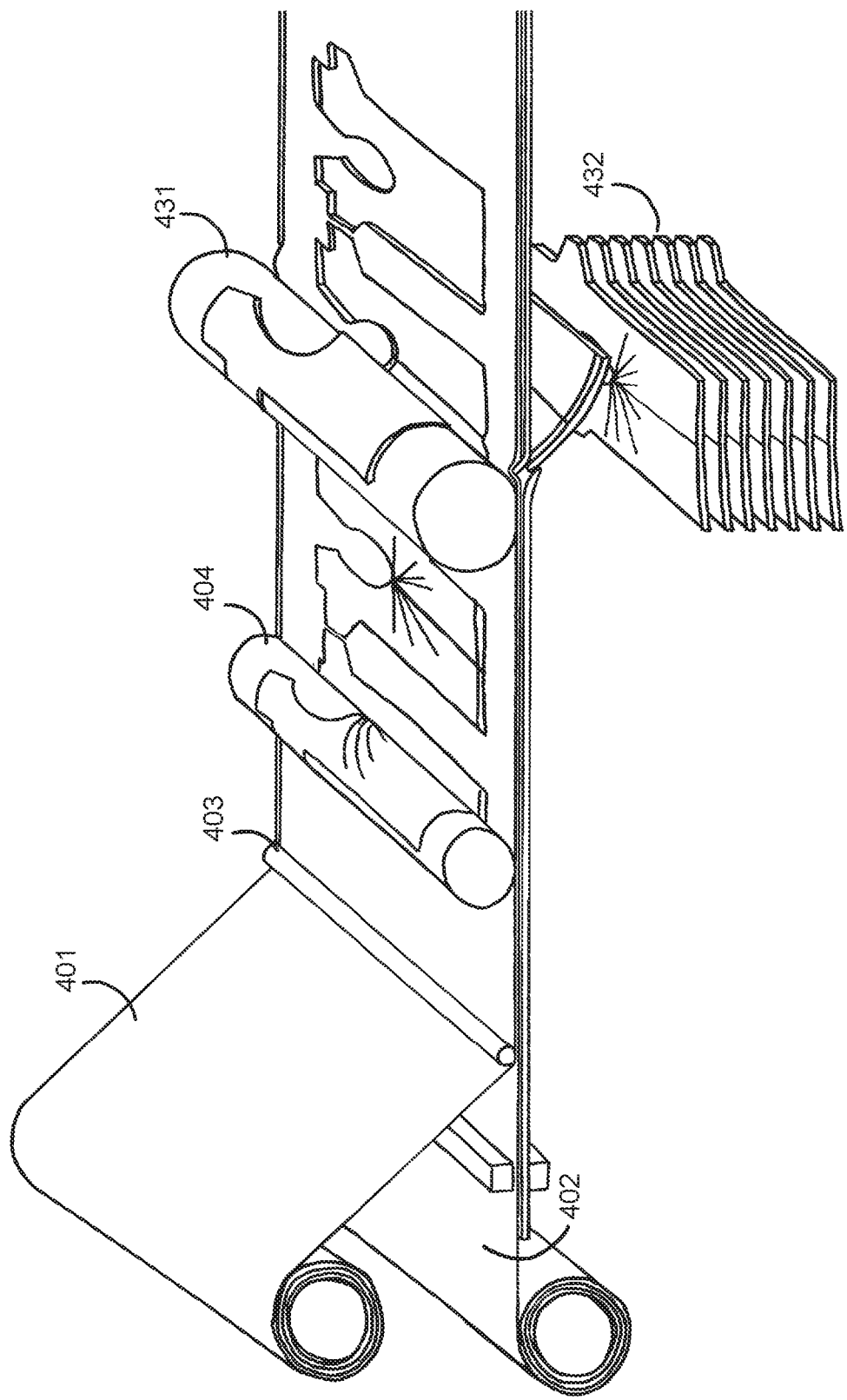
FIG. 9 illustrates a laminated, heat-softened posing agent application and its subsequent embossing by a textured roller and excision, by rolling cutter, of components from the contiguous textile in accordance with one embodiment of the disclosed technology.

An example of a laminated, heat-softened, posing agent application is demonstrated in FIG. 9, a film of posing agent 401 can be fed from onto limp textile 402 as it passes underneath. The posing agent is softened by a heat source, prior to the compression of the softened posing agent onto the textiles surface by a rolling drum, which can either be flat 403, and impose a uniform lamination; or textured 404 and impose an embossed surface.

The advantage of directly depositing the agent to the textile is that it's logistically and energy efficient and minimizes the number of steps and mechanisms that need to be implemented and monitored in the manufacturing process. The tradeoff, however, is that of added technical complexity in that the application mechanisms must be synchronized perfectly with the textile feed rates to ensure a consistent and even coating.

For most applications, laminating a plastic film onto the textile, in one or more layers, is likely to be the preferable option. In situations that call for it, however, the plastic can be deposited in molten state or in solution onto the film via curtain coating, screen-printing, spraying, dipping, or immersion. The plastic added in powdered solid form and then sintered together, and to the textile, under moderate heat and pressure.

Prior to and during the treatment of the textile with plastic, the tension in the textile substrate should be monitored and controlled to prevent deformation down the line. Textiles can be intentionally stretched to a desired tension or left at their neutral, resting tension, and the desired tension should be maintained until the textile and plastic laminate has fully cooled.

Since the plastic application may damage some of the initial aesthetic and haptic properties of the material, like its hand, luster, etc., the assembly process should be engineered so that the plasticized surfaces are not on the outside of the finished garment. Alternately, fabric treatments for these characteristics can be applied after assembly, when the posing agent has been removed.

After treatment with this process, components of a product will be formed from sheets of material. They can then be assembled and joined together. The assembled, or partially assembled, garment can then be worked over using extant textile joining and forming techniques, like sewing, hemming, fusing, riveting, gluing, pleating, darting, etc.

Agent Application onto Non-Flat Pieces

The previous example assumed that the textile was entering the manufacturing process flat, off of a roll. Although this is often the case, there are circumstances in which posing agent would need to be applied to a piece that was not flat—particularly in the case of knitted garment components that would be joined to woven components—like shirt cuffs, shirt necks, or certain collars for collared t-shirts.

In this scenario, the posing agent must be applied to the three-dimensional component in a different manner than the one described earlier. Knitted components can be placed on a mandrel resembling their desired form, and then be wrapped, soaked, or sprayed with a posing agent. The posing agent is allowed to harden, and then the component can join the assembly process.

Once the components have been joined, the temporary attributes are removed, leaving a completed product.

Posing Agent Recovery

If possible, the posing agent should be recovered for subsequent reuse. If the agent is in solution, the solution should first be filtered to remove any fibers that may have come off of the garments' textile components during assembly.

Once any solid contaminants have been removed from the solution, the posing agent can be recovered by evaporating the solvent, leaving the agent behind. This can occur through several commonly used techniques, such as vacuum evaporation (Gupta, 2009), spray or drum drying, or traditional distillation. The technique used should not employ heat that exceeds or approaches the pyrolyzation temperature of the posing agent.

After it has been recovered, the posing agent should be evaluated for contamination and degradation—though spectrographic analysis and standard material science tests. Once baseline contamination and degradation rates are determined, systematic tracking of the number of times a batch of posing agent has been used with a particular assembly process can be used to predict when it must be either refined or disposed.

In the preferred embodiment of this method, the flexible material can be laminated with a thermoplastic film that would cause it to become rigid. The rigid material can then be softened by heat and formed into the desired shapes of the components. The components can then be worked over using methods developed for working with rigid materials, like sheet metal or heavy plastic, such as gripping by robots or humans, stamping, roll-forming, crimping, hydroforming, vacuum forming, etc., in preparation for their final assembly.

Pre-Forming—Interfacing and Linings

Many garments are assembled from one or more layers of textile laid over each other. This is done for several reasons: For aesthetics—to control the stiffness of the garment (and thus the manner in which it hangs off the wearer), to reinforce the garment in structurally important locations (like button-holes), to prevent the textile from stretching to the point of permanent deformation, and to provide additional thermal insulation. Depending on the application, interfacing and linings may be joined at their perimeter, or fused together along some or all of their mutual surface area.

In the context of this process, additional layers are prepared in a manner similar to the laminating and cutting techniques previously described. After being positioned atop the primary piece, their relationship is fixed either permanently using standard fusible interfacing techniques, like an activated adhesive, or temporarily, using a soluble adhesive, a spot weld by softening the posing agent and pressing the interfacing onto the main piece at the softened location, or by mechanical fasteners made from the same removable material as the posing agent.

Commonly used interfacings are fused with thermally activated adhesive—since this may interfere with the posing agent, it may be necessary to apply fused layers prior to the process that sets the posing agent's thickness, or alternately use a non-thermally activated adhesive, like a UV- or catalyst-activated adhesive.

In the case of fusible linings, the textile and interfacing surfaces must be in direct contact with each other, and cannot have a layer of stiffening agent in between. In this scenario, the interfacing must be handled, positioned, and fastened while limp—although once fastened, it will benefit from the posing agent applied to the primary piece.

Since interfacing is often used to determine structural characteristics of a garment, it is important that the bulk to the layered materials added by the posing agent be minimized. This can be done by forgoing the application of posing agent to the interfacing, and just using the fastening techniques discussed earlier in this section, but it can also be achieved by varying the thickness of the posing agent in coordination with the corresponding posing agent's surface on the adjacent layer. Interlocking posing agent applications can minimize overall bulk without completely sacrificing the handling advantages of the posing agent.

Looser materials, like batting or insulation, can also be handled by this process: they can be treated with the stiffening agent and then compressed into thin sheets for handling.

Bulky Material

Bulky textiles, like batting/insulation, either loose or in a sheet, can be prepared for handling in this process by treating it with the posing agent and compressing it between rollers or a die while the posing agent hardens. Once the material has been treated, it will resemble a non-woven textile, and can be cut and handled like the other textile pieces. After the posing agent is removed, if an accommodating space is left between the garment layers, the material will return to its normal volume. Care should be taken to ensure that the material being treated will not permanently deform when exposed to the temperatures and pressures applied during manufacture.

Figure 10:
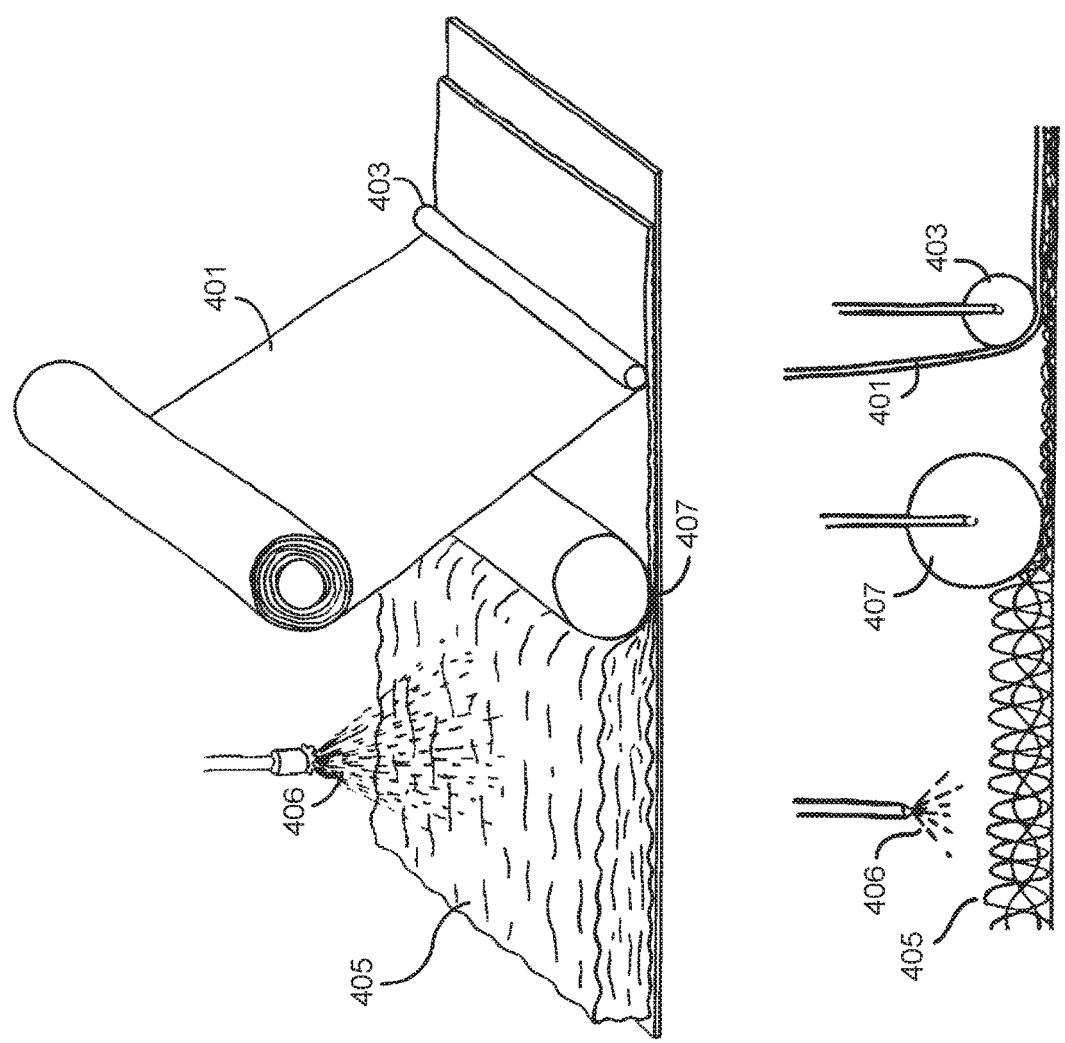
FIG. 10 depicts a loose, bulky material as it passes underneath a spray nozzle of either molten posing agent or posing agent in solution.

FIG. 10 depicts a loose, bulky material 405. As it passes underneath a spray nozzle of either molten posing agent or posing agent in solution 406, the loose material is coated with posing agent. The coated material is then compressed by a roller 407, temporarily altering the density of the material. This process can be enhanced if performed in a vacuum, to ensure that the volume is minimized.

Optionally, after or during compression treatment, the dense material can be given a secondary treatment of posing agent 401, deposited as a film and laminated by a second heated roller 403. This secondary treatment provides a uniformly sealed surface, which is advantageous for vacuum gripping, or any other forming or gripping methods that would benefit from an airtight surface.

Utility of Variable Posing Agent Thickness

The posing agent's thickness may vary in places to provide specific behaviors in subsequent assembly steps. The variation in thickness will provide areas of variable stiffness and flexibility where needed and should be optimized to minimize the weight of the posing agent used per application.

Structures rendered on the treated textile surface can interact with subsequently encountered machinery—acting as guide rail, track, or a toothed belt so it can be fed consistently and easily into a machine.

Figure 11:
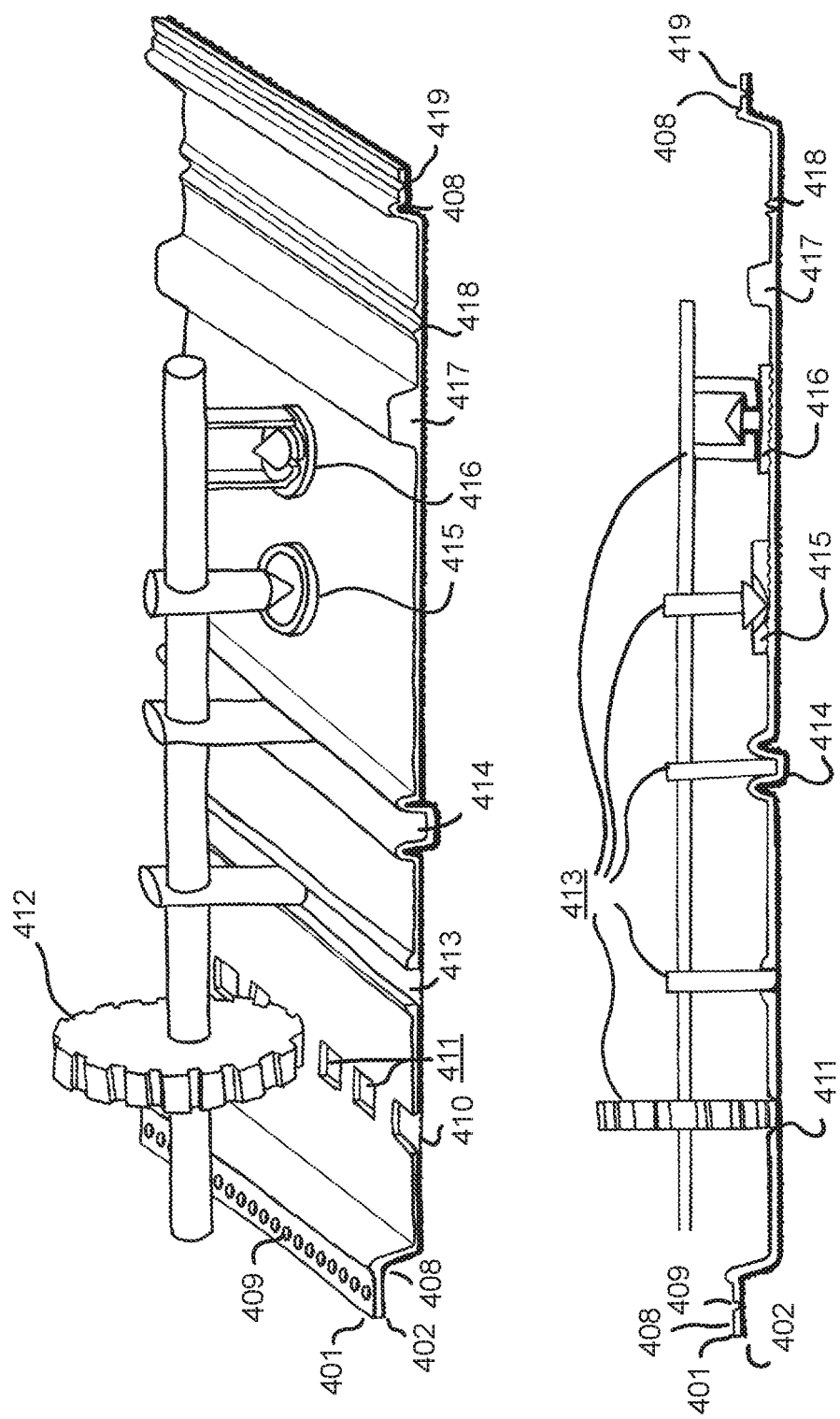
FIG. 11 depicts a textile treating with posing agent, configured into, and affixed with, a variety of functional surface features in accordance with one embodiment of the disclosed technology.

A variety of examples of variable posing agent thickness can be seen in FIG. 11 in which the textile 402, treated with the posing agent 401, has an articulation line running along its length 415. Additionally, the posing agent is thinned significantly along its seam flange 405, to minimize seam bulk and made to facilitate needle penetration with perforations 406 and a continuous trough 415. Also depicted are a structural reinforcement 414, and registration 412 and gripping 413 points.

FIG. 11 also depicts a variety of functional elements including smooth 410 and toothed 408 tracks embossed into its surface, which interface with corresponding components in the feeding and guiding mechanisms of various machinery 416.

Also depicted is a similar guide-rail molded into the treated textile 411, note that in this case, the treated textile itself has been molded into the rail, rather than having the rail molded onto its surface, accomplished with deep-relief embossing or a subsequent roll-forming or molding process.

Methods for Setting Posing Agent Thickness

Thickness can be determined via embossing, engraving, or etching, which would likely be determined by the scale of production:

Embossing

Embossing is accomplished with a surface textured as the negative of the final topology: Either as a plate or revolving cylinder, the textured surface is pressed into the pliable posing agent, displacing the agent from areas where it should be thin and depositing them where it should be thick. The embossing surface can either be heated or pressed into pre-heated agent.

Embossing has the advantage of being the highest efficiency and highest throughput technique, but has higher tooling costs and cannot be adjusted per-piece for applications requiring mass-customization.

Engraving

Engraving is accomplished by pressing a scribe into the posing agent. The scribe is then moved to trace a desired pattern into the agent, displacing the agent in its path. This can be performed by hand, or automated with a Cartesian plotter device.

Engraving can be useful in custom applications and experimental setups, but is limited by low speed/throughput and the degree to which the posing agent can be displaced (engraving is suitable for adding lines—articulation creases and seam perforations, but wouldn't be able to remove a large, solid, area of material). The scribe can be applied while the posing agent is hot, or a heated scribe can be used against cool agent.

Etching

Laser etching is accomplished with commercially available laser etching machines A computer controlled laser beam traces the surface, evaporating a thin layer of the agent with each pass.

Etching has the advantage of being extremely accurate, however, this is the only process that permanently removes the (otherwise recoverable) agent from the manufacturing cycle, and so might be undesirable in large-scale applications.

In addition to altering physical attributes, the system can apply visual and physical markings to assist manipulation down the line. Visual markings can include data-encoded one- or two-dimensional graphics (e.g., QR codes or diagram/orientation guides) so a camera or worker can determine the intended position and orientation of any given part. Further markings can be used for precise alignment and registration when joining molded parts. Guide-lines can also be printed on the fabric to direct any number of processes—like sewing, cutting, folding, pocket-adding, button-adding, etc.

Physical markings can consist of graphics imprinted on the surface of the material, topological markings, or physical components that are temporarily attached to the surface of the material. Topological markings can also be dual purpose and perform non-informational roles, such as creases that serve as precursors to subsequent joining, bending, crimping, darting, or pleating operations.

When used on materials that have an uneven surface that would preclude useful printing, the visual markings can be applied on top of a layer of the posing agent, which can be used as a more appropriate printing surface—sealing gaps, smoothing over textures, providing a chemically compatible surface, etc.

Topological markings, added physical components, or a combination of the two, can serve as aides to the action of an assembly process in the manner of a jig, registration points, guide rail or track, or a toothed rack so it can be fed consistently into a machine.

Doping

Depending on the complexity of the assembly process, it may be desirable to alter the characteristics of the posing agent layer to facilitate observation and interaction in subsequent steps.

The ability to selectively heat a piece, regardless of its accessibility or positioning, may be required to join, separate or reform a piece or pieces during assembly. Adding susceptors to the posing agent, a mixture of fine metallic and/or ferromagnetic particles into the posing agent, would allow it to be heated by exposure to electromagnetic radiation or induction heating.

If the metallic particles are magnetically responsive, like iron filings, then the doped patch can be gripped by an electromagnet.

If the posing material is instead mixed with a pigment, it can serve the role of an indicator, as described in the previous section. If the pigment is radio opaque, it can be used to scan the arraignment of the pieces in subsequent assembly steps and can provide helpful quality control feedback.

A pigment that fluoresces when exposed to ultraviolet light 412b, at appropriate concentrations in the posing agent, can be used to indicate the relative thickness of the posing agent across the piece's surface 411b. This information can be interpreted via machine vision or a human worker, and can be used to indicate helpful positional information (in a manner similar to the methods discussed in the previous section), as well as reveal any errors in the posing agent's application or the underlying textile's structure.

The addition of an opaque or translucent pigment in a color dissimilar to the textile being treated will allow for a contrasting pattern to be revealed once the posing agent's thickness is set. Areas of high contrast can be used to convey information to machine vision processes, and translucent pigments—which would vary, visually, by thickness of the posing agent—can be used to meter the posing agent's thickness for quality assurance purposes.

Applied Indicators

In complex, asynchronous assembly operations, it may be necessary to label individual parts with instructive information regarding the identity of a given piece, its intended orientation relative to the machine vision camera or assembly worker ("this end up"), and the relationship it should have to adjacent pieces—providing visual, instead of mechanical, registration markings.

Indicators are particularly useful in assembly operations that are not wholly automated and require some degree of human interaction. Guide-lines printed on the textile can direct any number of processes—like sewing, cutting, folding, pocket-adding, button-adding, etc.

The indicators can be applied in a temporary manner with pigments either printed directly onto the posing agent's surface, or mixed into the posing agent itself. The indicators can also be embossed solely as a texture onto the agent's surface, being revealed with the application of an oblique lighting source.

Topological indicating information can also be derived from surface modifications with non-informational roles, like the creases that serve as precursors to subsequent joining, bending, crimping, darting, or pleating operations.

Indicators can consist of simple, informative geometric symbols—like diagrams, matching shapes, or simple numbers—or contain relatively complex information encoded in one or more machine-readable 1-dimensional or 2-dimensional barcodes.

Figure 12:
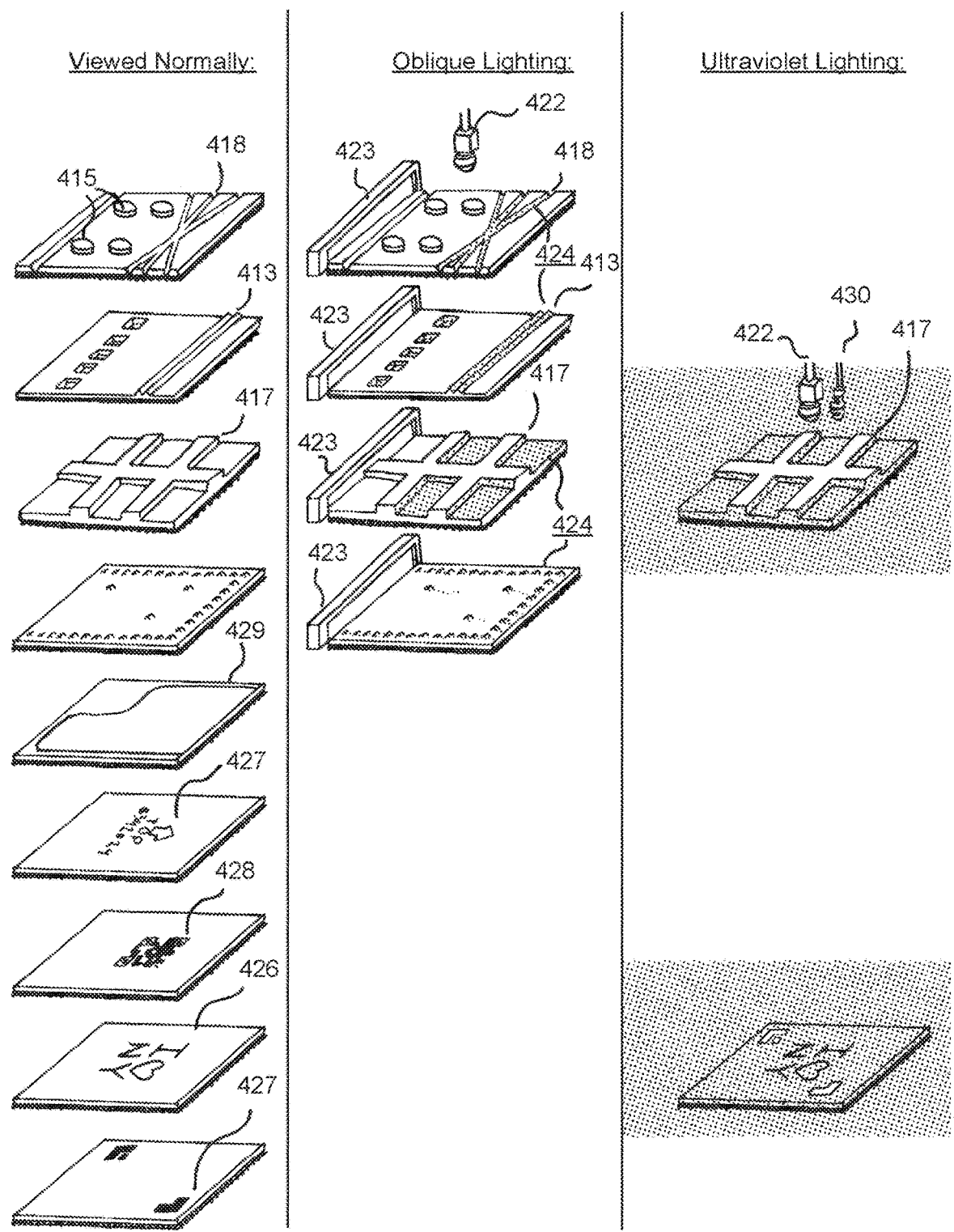
FIG. 12 depicts a variety of types of surface indicators in accordance with embodiments of the disclosed technology.

FIG. 12 depicts a variety of types of surface indicators. Pieces of textile 402 treated with posing agent 401 are presented with patterns 421 embossed, printed, or enjoined onto their surfaces. Note functional "patterns", like articulation creases 418, gripping or registration points 415, embossed mechanical interaction guides like teeth or rails 413, and structural reinforcements 417, which can be imaged using a machine vision camera 402 coupled with an oblique, possibly collimated, light source 423. The characteristic shadows 424 cast by the various surface features can be used to indicate piece orientation with respect to the camera and any tooling or incoming effectors. Additionally, any aberrations in shadow placement would indicate errors in the piece, serving as an opportunity for quality assurance determinations.

Surface indicators can also be printed onto the piece using pigments, and interpreted by machine vision with standard lighting 425. Indicators printed onto the surface of the posing agent will be removed at the same time as the posing agent, during the washing stage. Decorative graphics printed directly onto the piece itself 426, which will stay on the garment permanently, can also be interpreted using common machine vision techniques.

Temporary markings can be simple geometric forms, like blocks or arrows 427, used to give generic positioning information, can contain data encoded in characters legible to optical character recognition software (or, of course, human operators), or can contain data encoded in 2- or 3-dimensional barcodes 428. Markings can also be used to convey practical guidelines to machines or operators—indicating the path that a hem-fold should follow, or alignment markings adorning the inside edge of a future seam 429. Similarly, informative graphics can be embossed into the posing agent's surface, in a manner such that when lit obliquely, shadows are cast in the shape of the desired informative graphic 430.

Temporary Functional Surface Features

After the posing agent has been applied to a textile and its thickness has been set by embossing or methods, additional features can be added to the treated surface.

Registration Points

Registration points are functional surface features that allow two or more pieces to be positioned against each other with a high degree of precision. A tapered mating surface ensures that, as the two halves approach each other, they will be mechanically forced into alignment, similar in concept to center compliance mechanisms. Registration points can be used to ensure accurate positioning on interfaces between piece and piece, piece and jig, and piece and gripping effector—including actuated mechanical grippers and vacuum or electromagnetic effectors.

Gripping Points

Gripping points allow for a piece to be securely held in place by a gripping effector, jig, or adjacent piece without damaging or distorting the textile.

For short-duration grips, a simple mechanical knob or handle can assist a machine to get a firm grip on a piece. For medium-duration grips, a cam lock could effectively hold and release. For longer-duration hold by gripping effector or jig, a screw socket would work well, to be secured by a bolt if repeated grips are required or a self-tapping screw if the gripping point is only used once.

It may be necessary for a gripped piece to have one or more axis of motion available during a manufacturing step. In this scenario, the gripping point would resemble a ball hitch or either half of a hinge, allowing a corresponding gripper to hold it securely in one or two axis of motion.

In the case of a gripping interface between two pieces, the bond can be held permanently (until the end of the assembly process) with a snap rivet, or temporarily with a hook and loop fastener.

Any gripping point can also include the functionality of a registration point.

FIG. 11 demonstrates a registration 415 and gripping point 416 affixed to the surface of a textile 402 treated with a posing agent 401.

Types

Functional surface features can be added to a piece in one of three ways: They can be molded directly into the posing agent that already coats the textile, they can be injection molded directly onto the agent, or they can be made separately and then attached to the piece. If they're made separately and then applied, they can be made from the same agent that's used as a posing agent, or it can be made from a different material.

Only very simple registration points can be molded directly into the treated surface, they are impressed into the agent with a hot die or pressed into the textile while it's still hot.

More complex functional surface features require the application of additional materials—for some features, it may be expedient to injection-mold them directly onto the surface of the piece.

The most complicated features, like cam locks, may require separate manufacturing processes in advance of their placement on the piece.

If the separately molded piece is made from the same material as the posing agent, it can be joined to the surface with the application of heat from a blast of hot air, exposure to a heating element, infrared radiation, or RF heating—accompanied by pressure. The same effect could be achieved with an ultrasonic welding apparatus. Alternately, a small amount of solvent or temporary adhesive would bond the two surfaces together.

If the separately molded piece is made from a different material than the posing agent, it's more likely that a temporary adhesive would be required to bond the surfaces. Alternately, a mechanical bond can be obtained by texturing the surface feature's bonding face and pressing it into the heated posing agent. Surface texture can be applied via machining, grinding, particle blasting, laser etching, or chemical treatment.

Surface features made from materials that are not dissolved along with the posing agent will fall off of the assembled garment at the end of assembly, when the posing agent that they're affixed to is removed. They can be recovered and reused. The material may be chosen for its specific properties—magnetically responsive materials would be required gripping points for electromagnetic gripping effectors, and a gripping point made from a flexible gasket material would mate well with a vacuum gripper.

Registration and gripping points can, and likely will, be mated with effectors equipped with remote center positioning mechanisms to correct for any variances introduced during any manufacturing steps, prior to subsequent operations.

Cutting

The cutting room is where most of the high-tech and high-output optimization has occurred in industrial-scale garment manufacturing, and there is little improvement to be made here. Presently, cutting operations for garment assembly use handheld cutting tools, die-stamps presses, and CNC tools like plotter knives, laser cutters, and water jet cutters.

The only new cutting technique made available by the application of a posing agent is that of a rolling die cutter, which allows a high volume of pieces to be cut accurately from a plane, which may be necessary since most other bulk cutting techniques require that the textile be layered many times atop itself, which could be a limiting factor once the posing agent has been applied, since the many layers of posing agent will significantly add to the force required to cut through the stack. The relatively high tooling costs for this equipment would restrict its use to large production runs.

Collecting and Buffering

After cutting, the pieces should be collected and sorted for delivery to the assembly process 32. The machine-readable indications and functional surface features provide a means for a robot to recognize and pick up pieces after they've been separated from each other.

In high-volume streamlined manufacturing scenarios, the cut pieces can pass directly to the assembly phase, but in lower volume scenarios where available equipment is a limiting factor, it may be economical to have a single prep line producing all of the pieces for assembly.

Even in high-volume operations, it's helpful to consider a logical break between the prep and subsequent phases—in the event of a backup in the production process, this provides a good opportunity to buffer the pieces, since they can be stored in a stable, compact manner and consumed as needed once production resumes.

After the components have all been formed, they can be assembled together and joined using traditional textile methods, like sewing, fusing, or riveting.

Hemming and Folding

Garment edges are usually finished with a hem, by folding the textile back on itself one or more times and then securing the fold with adhesive or a sewn seam. This can be easily performed on textile treated with a posing agent, by softening the posing agent along the line to be folded, by taking advantage of creases made in the posing agent, or by a combination of the two.

The flat textile is fed through a folding guide, which bends the textile at the desired location and folds the hem back on itself. The hem can then be secured immediately with adhesive or a seam, or left in place—secured by the posing agent—and secured later. Multiple folding guides and sewing can be arraigned inline with each other to produce any arbitrary hem. As the textile exits the folding guide, a roller can compress the fold to further crease the textile.

Creases are often preserved and made permanent by the application of a "permanent press" treatment to the inside of the fold. If this step is going to be performed on a textile that's been treated with a posing agent, it is important to ensure that the crease preserver is applied to the non-treated face of the textile.

The folding guide, presently used for making hems on sewing machines (U.S. Pat. No. 1,988,140A), has a broader potential use in conjunction with the posing agent treated textile. Stiffened textile of any size and dimensions can be folded linearly or along an arbitrary curve by passing it through a folding guide, an assembly step that is likely to see frequent use in practice.

Surface Features

Many garment surface features can be applied at this step, to take advantage of existing machines that can perform these tasks autonomously. Devices to add functional elements (like snap clasps, pockets, buttons, and button holes) or decorative elements (embroidery and printed graphics) are already in widespread use, and can be made to work with posing agent treated textile with minimal modifications.

Many of the current tools that are used to partially automate steps of a garment manufacturing process, such as shirt pocket machines, presently require that a worker place onto and align the textile pieces on the device, before the automation takes over, automatically folding and sewing the pocket onto the textile. In this improved process, the increased manipulability of the treated textile allows for precise automated placement of pieces onto a machine, negating the need for a worker. The same is true for many other semi-automated processes in current use: This process allows for automated coordination with button and buttonhole machines, embroidery machines, and devices to apply any other decorative elements: Sequins, rivets, adhered glitter, etc.

The untreated surface of the rigid textile can be placed accurately onto a printing machine to receive a decoration using any of the standard printing or transfer techniques—screen printing, dye sublimation, pad printing, airbrush, or inkjet printing, along with any necessary post-printing curing steps.

Three Dimensional Forming

Shaping Pieces

The ability to temporarily mold the cut pieces is the principal advantage conferred by the posing agent, allowing the pieces to be arranged into their assembly positions and held there while they're permanently secured.

The shaping phase is analogous to many conventional forming processes used in the production of parts made from sheet plastics and metals. After softening the posing agent, the piece is deformed and allowed to harden again in its new shape.

If the geometry of the piece makes it difficult to ensure a consistent registration and deformation due to the piece shifting during the mold closing, it may be necessary to use registration points to position certain points of the piece at specified coordinates on the mold. It may also be desirable to use a gripping point to lock those positions in place during the molding process. If it is necessary to have registration points or gripping points, it may also be necessary to separate the motion of the gripping points from the motion of the mold halves, either via active articulation or passive spring-mounted motion.

Once the piece has been set on the mold, it is necessary to perform a softening-hardening cycle to set the textile into its new shape. The softening phase can occur prior to, during, or after the mold closes around the textile, but the hardening phase must occur after the mold has closed and before the textile has been released.

If the softening treatment is heat application, it can be applied in a number of ways. The mold itself can be heated, to heat the piece via conduction when the mold closes. Alternately the piece can be softened underneath an infrared radiator, it can be exposed to a blast of hot air, or passed across a heated roller or plate. It can also be softened more selectively with a scanning laser, directed jets of hot air, or by exposure to an infrared radiator that's masked to block some of the radiated heat. If the posing agent has been doped to make it receptive to electromagnetic radiation or induction heating, either can be applied to selectively heat the treated areas.

If the hardening phase requires that the formed piece be cooled while in the mold, that can be done by drawing the heat through the mold, assisted via active cooling in the form of circulating coolant, or a passive or fan-cooled heat sink.

The surface of the mold itself can also be a thermoelectric junction that heats the piece when current is flowing in one direction, and can then be immediately switched to cooling by reversing the flow of current.

It may be desirable to selectively soften the posing agent in some locations, while leaving it rigid in others. This may be to preserve delicate indicators and seams on the agent's surface, or to reduce needless energy consumption. It can also be done to selectively alter the tension in the textile substrate, which will affect how it joins with other materials and the shape it will take while worn. For example, an elastic band ribbon for a sweatpants seam, treated with a posing agent, can be stretched to, and held steady at, the diameter of the pants so that it can be attached easily. After the posing agent is removed, the elastic band will return to its normal diameter, and the waistline will cinch, as per its design.

Figure 13:
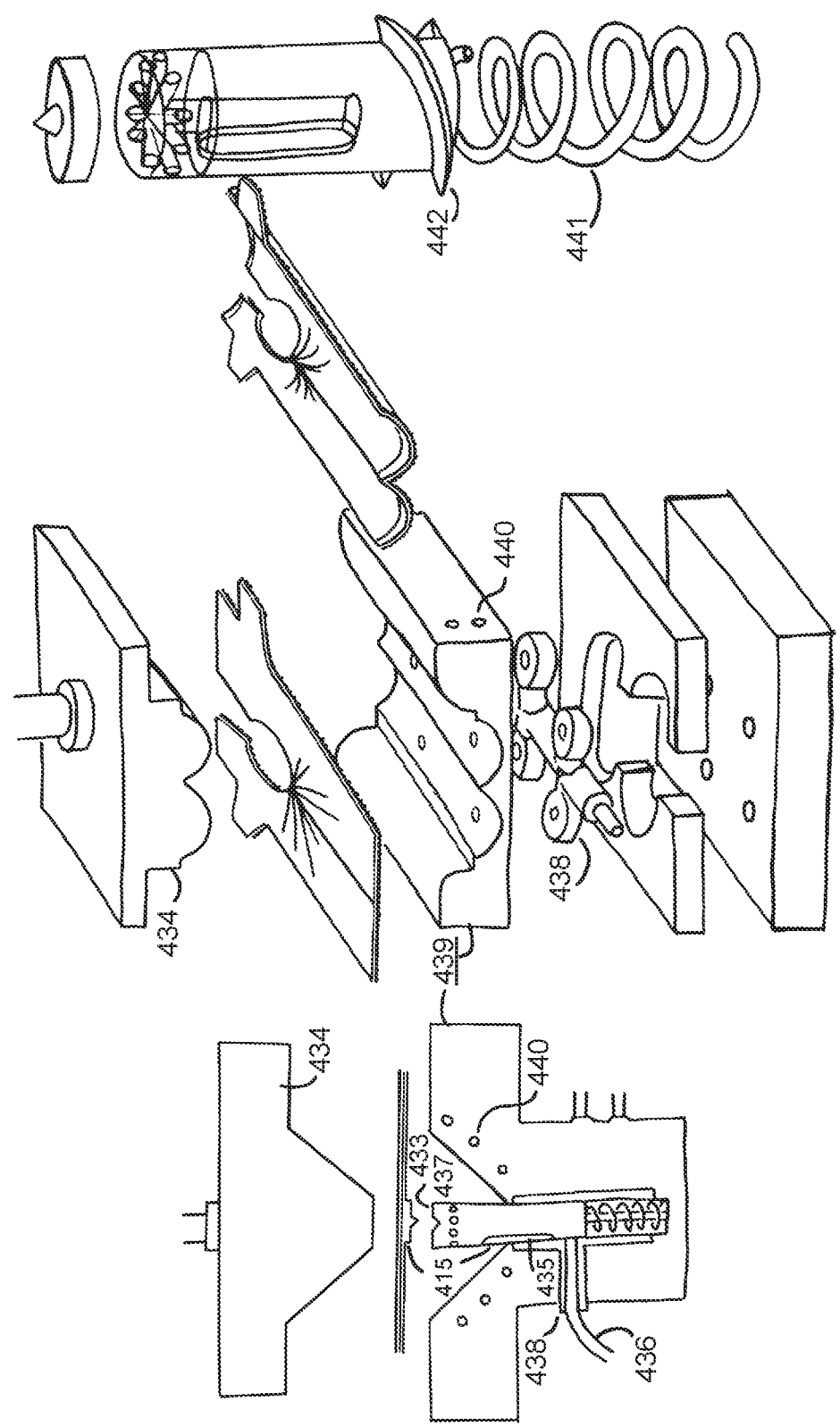
FIG. 13 depicts a mechanism for imparting a form to a material treated with a heat-softened posing agent.

One mechanism for imparting a form to a material treated with a heat-softened posing agent is demonstrated in FIG. 13. A textile 401 treated with a posing agent 402 and augmented by a registration point 415 is placed onto a post with a mating registration point 433. When the forming die is closed, the top half of the die 434 compresses the post so that the valve 435 is opened, allowing hot air, originating from the heated, pressurized input 436 to flow out of the outlet nozzles 437 and across the surface of the posing agent, softening it. The ducts providing the heated, pressurized air through the cool mold are isolated by a layer of insulation 438.

As the piece is pressed against the bottom half of the mold 439, it is conformed to the desired shape. The bottom half of the mold is kept cold via circulating coolant 440, which cools and hardens the posing agent, allowing the piece to retain its imparted shape. After forming, the post is returned to its initial position via a spring 441. A helical groove along the length of the post 442 causes it to rotate with each stroke, so the hot air valve is not opened on the return trip.

It is intended that the interior faces of the mold halves be easily removable and interchangeable, such that the press can be rapidly retooled for use with a different pattern.

Other Forming Methods

The wide range of techniques currently used for working with sheet plastics and metals can be adapted to manipulate and form the treated textile. This includes techniques like vacuum and pressure forming, which can be used to draw the softened textile tightly across a surface, so that it will preserve the desired shape as it's allowed to cool. Other metal forming tools, like press breaks for forming long bends (like pleats or hems) and rolling wheels can be used to manually or automatically impart curved surfaces.

Seam Flange Preparation

Depending on the thickness and strength of the posing agent, as well as the number of layers of agent and number of layers of textile that need to be sewn through, it may be necessary to prepare the seam for sewing. To this end, the posing agent can have perforations or troughs formed in its surface during the step in which the posing agent's thickness is determined, or it can be applied after the forming phase by stamping or rolling the posing agent with an appropriate die.

It may be necessary to thin the stiffening agent, and possibly the textile, to minimize the bulk of the seam during and after assembly. This can be done during an earlier embossing, etc., step or by passing the edge through a skiving machine, which will slice or grind off a thin, tapered layer of the posing agent or textile.

The face of the pre-seam surface must be aligned so it is parallel with its corresponding face on the joined piece. The angular orientation of the seam flange can be determined in the main pressing phase, or in a subsequent step in which the face is remolded into place.

FIG. 11 demonstrates a prepared seam flange. The textile 401, treated with a posing agent 404, has been bent along its edges to correctly angle the seam flange 408 for its future mate. Additionally, the seam flanges have been thinned in anticipation for needle penetration, continually 419 and as a perforation 409.

Post Forming

After the form has been set, it may be desirable to treat the textile with agents to permanently set some of the features, like pleats, darts, or the shape of drapes, using permanent press treatments that are currently in widespread use.

After forming the piece, it may also be desirable to perform some of the steps described in the hemming and folding or surface features pre-forming sections, if their application needs to be deferred due to the possibility of the forming process damaging or deforming the hem, fold, or surface feature, or the possibility of the hem, fold or surface feature interfering with the forming process.

Assembly

Positioning

After forming, the pieces are gripped and positioned relative to each other using a specialized assembly effector, static or actuated positioning jigs, combinations thereof, or the like. Gripping and registrations points can be utilized to ensure correct alignment between the assembly effector and the pieces, the pieces and other pieces, or the pieces and a positioning jig.

Figure 14:
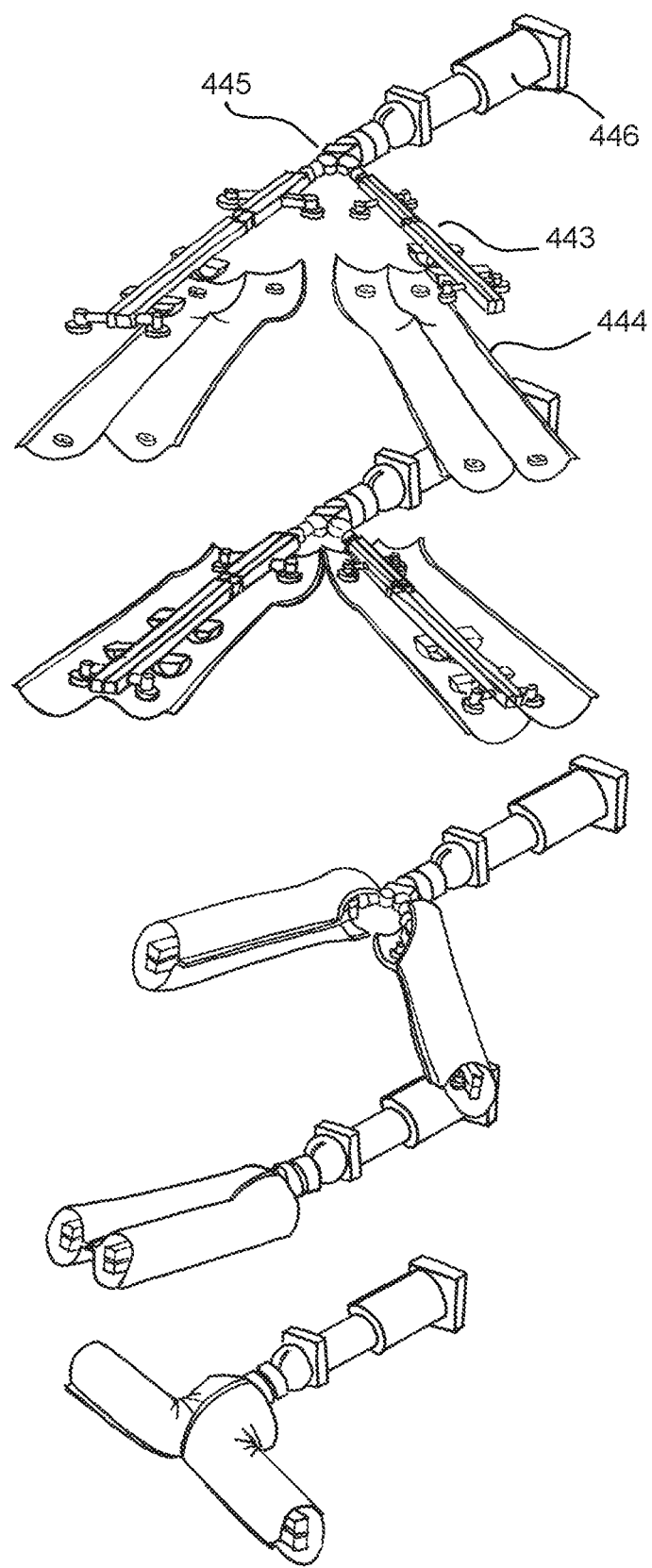
FIG. 14 depicts an articulated assembly jig effector in accordance with one embodiment of the disclosed technology.

FIG. 14 depicts an articulated jig effector. Garment pieces 443 are held by vacuum, electromagnetic, or mechanical grippers 444, with their registration points used to correctly align the pieces with the jig. Radial 445 and linear 446 actuators allow precise control over the entire garment's, or individual garment components', spatial relationships with machines and other components of the garment.

As depicted, the actuators on the effector can be used to manipulate the garment in a number of ways. Although relatively flat when grasped (Steps 1 & 2), the molded garment pieces can be folded back on themselves (Step 3). Once temporary joints or permanent seams are made (Steps 3 & 4), the partially assembled garment can be further manipulated to make otherwise inaccessible seams available to permanent joining operations (Step 5). This active repositioning is an alternative or compliment to the passive repositioning discussed later, in the "collisions" section.

Active repositioning can also consist of mechanically actuated faces or pneumatically expanded balloons, that—when activated—press against the inside of a seam, causing it to expand outward and be exposed to machinery.

Pinning

Once the pieces have been correctly positioned relative to each other, they can be joined together immediately, or pinned temporarily in anticipation of a subsequent joining step. Temporary joints can be contiguous along the length of a seam, or spot joins in key locations.

If the posing agent can be joined to itself, there are a number of options available: for joining two pieces with at least one layer of posing agent between the two textiles to be joined. To form a joint, the posing agent must be softened prior to joint compression. If the posing agent is softened by heat, a sonic-, radio-, or laser transmission welding device can be used to heat just the posing agent at the boundary between the two materials.

If the posing agent cannot easily be joined to itself, there are other options available—the joint can be rolled over, like the top of a soup can, and held together mechanically, it can be joined with a temporary adhesive, or snap-clasp gripping points can be used to secure the pieces relative to each other. Furthermore, pseudo-permanent joins can be made using rivets, staples, or pins made from the same material as the posing agent, so that they can be easily removed at the end of the assembly process.

Sewing

Once the pieces have been positioned and secured, they can be joined together permanently.

Some accommodations may have to be made to the normal sewing processes, to account for the presence, thickness, and strength of the posing agent, as well as the fact that the posing agent is going to be removed after assembly, leaving a gap where it used to reside.

The issue of penetrating the posing agent with a sewing needle, if not entirely resolved by the application of trenches or perforations in the seam flange preparation step, can be further addressed by the use of a stronger needle and thread than would otherwise be called for. The posing agent can also be softened in advance of the needle. If the posing agent is softened by heat, the needle itself can be heated, or the agent can be softened by contact with a heated element, or exposure to a radiating heat source.

It is necessary to synchronize the motion of the seam being sewn with the action of the sewing machine. Given fine-grained enough control over the precise position of the assembly, the motion of the piece relative to the sewing machine can be broken down into steps that correspond with the desired stitch length, and moved from step to stitch in stich with the sewing machine's motions.

If motion control systems are insufficiently accurate to allow for this, any elasticity in the treated textile can be exploited so that the movement of the piece through the sewing machine is equal to the average feed rate of the sewing machine, and during the periods of time in which the piece is moving against a static needle/presser foot, the tension is distributed across the garment.

Alternately, the garment can be grasped by an effector that allows for some degree of compliance along the seam's path, and can thus provide a motion buffer against the sewing machine. If this is the case, the effectors compliance vector's magnitude should not exceed the length of one stitch, and its direction should be limited to that of the stitch.

A mechanism to provide this functionality is demonstrated in FIG. 15. A tip intended to complement a registration point 447 is mounted in a track 448 that allows for 1 dimension of motion along the direction of compliance. A movable block 449 is intended to limit the magnitude of the compliance, and is mounted on a screw 450, actuated by a drive shaft 451. A spring 452 is mounted to the point opposite the direction of compliance to provide a resistance force and return the point to center. The spring's tension can be adjusted by turning a screw 453. The entire effector can be rotated by an external shaft 454, which controls the directional component to the compliance vector.

In use, in FIG. 15's 2nd step, we see a fabric 402 treated with textile 401 being pulled by a feed dog 455 and presser foot 456 in order to advance the textile one stitch length. The spring 452 is distorted under the tension, and the piece is allowed to move forward the length of one stitch, regardless of the precise positioning of the effector that's moving the piece along at the average feed rate. This effectively buffers the stepped motion of the sewing machine against the continuous motion of the robotic arm.

Figure 16:
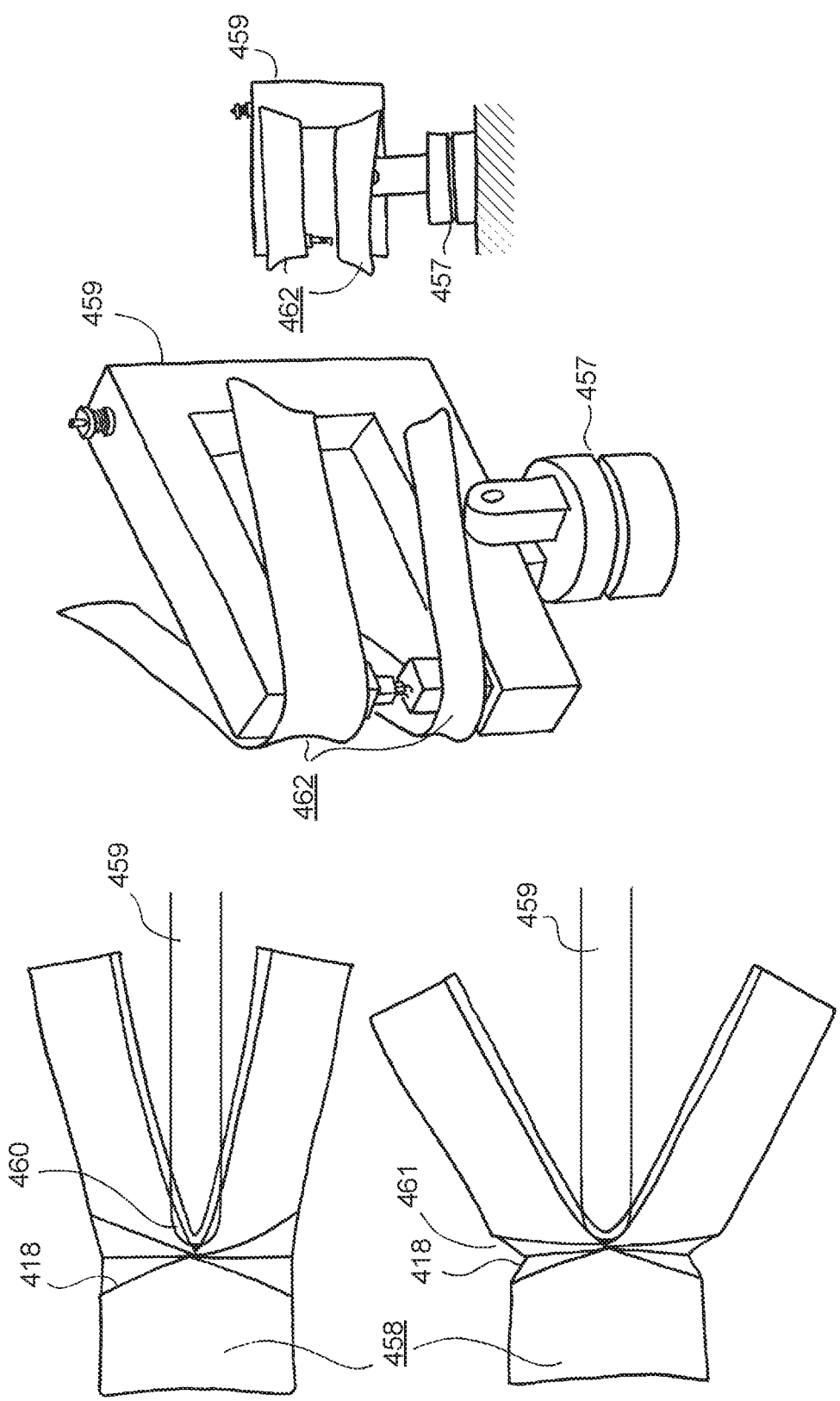
FIG. 16 depicts a guided deformation of a garment and a mechanism that can be used to adjust the orientation of a sewing machine to a garment.

In order to assist the manipulator that's feeding the garment through the sewing machines, it may be necessary to mount a sewing machine on mechanisms that can be used to adjust the orientation of the sewing machine to the garment, along numerous axis of motion. Such a mechanism 457 is depicted in FIG. 16.

Since the posing agent can take up a proportionally large amount of space between two layers of textile, it's necessary to consider the gap that will be left when the agent is removed. To compensate for this, it may be necessary to sew with a higher tension in the thread than one would otherwise use, anticipating that the tension will be relieved once the posing agent is removed. Alternately, the thread can be made of a material that will shrink slightly when exposed to the heat or humidity of the finishing, washing, and drying steps.

After each sewing step, or after several sewing steps, it's necessary to trim loose threads that may be present at the end of a seam. The high level of positional accuracy allowed by the posing agent and registration points allow the garment to be passed against an active or static cutting tool, possibly equipped with a vacuum duct, to cut and remove any loose threads.

It's worth noting an additional existing problem that's addressed by the application of a posing agent to the textile pieces. Multi-layered fabrics can suffer from seam distortion due to a differential in fabric feed rates, often due to low friction between fabric layers. This can cause seams to "pucker", which is undesirable, and is often resolved with complex machinery that attempts to apply the feeding pressure more evenly across all the layers. However, textiles treated with a posing agent could easily be fully bonded to each other prior to stitching, thus avoiding the need for complex machinery.

Non-Sewn Seams

Adhesives can be used in place of needles and thread to join two pieces together. Additionally, rivets can be used to reinforce or bind seams. Some synthetic textiles can be fused to themselves with sonic- and radio-welders, as well as heat sealing driven by hot air or contact with a heated element. Additionally, laser transmission welding can be used for this, by directing a beam of light at a frequency engineered to pass through the posing agent, but be absorbed by the textile.

If a textile seam is going to be fused, then it is important that the non-treated surfaces be mated to each other, a consideration that is not required for sewn joints.

Collisions and Realignments

For the purpose of this discussion, we'll use the term collision to describe any situation in which a stitch needs to be made in an area, or along a seam, which cannot be reached by the sewing machine due to interference from other elements of the garment.

During the sewing of tight corners (for example, at the armpit of a shirt or inseam of a pair of pants), it may be necessary to resolve collisions between the volume of the garment being assembled and the sewing machine being used. Although this is a trivial issue for traditional methods of garment assembly, in which the limp textile can be easily be bunched together or spread out and shifted relative to the machine to avoid any collisions, it becomes a more important issue to consider when the textile has been stiffened.

In the more straightforward collisions, articulation creases formed in the posing agent can allow the garment to deform elastically in a predictable and repeatable manner. The sewing machine can be fitted with deflection guides to aid in the deformation and restoration.

A straightforward example of a collision is depicted in FIG. 16, in which a garment 458 is fed into a sewing machine 459. The geometry of the garment is such that a collision occurs 460, where the garment is trying to occupy the same space as the sewing machine. Articulation creases 418 are employed to allow the garment to deflect from the collision 461, aided by deflection guides 462 affixed to the sewing machine.

In more complex assembly processes, in which the simple elastic deformation is insufficient to resolve the collision, it may be necessary to inelastically deform the garment using an intermediate pressing stage, similar to the initial piece forming process. During assembly, garments can be partially or wholly reformed to expose edges or create geometries that would not be otherwise present or accessible.

Intra-assembly remolding can also be used to align seams that were not mated in the garment pieces' initial positioning, due to limitations from piece geometry or the necessity of leaving a seam accessible to sewing machines. Subsequent remolding steps can distort finished seams to make others possible/accessible.

Eversion

For most garments being assembled, up to this point all steps would have been performed with the garment inside-out. At the end of the assembly process, the garment must be everted into its final form for washing, pressing, folding, and packaging. A possible solution to this problem is proposed, consisting of a mechanism to effect the assembled garment's eversion onto a specialized frame.

In use, the assembled garment is placed adjacent and opposite to an eversion frame, and then the posing agent stiffening the garment is softened—either the entirety of the posing agent or just partially, in strategic locations. The garment is transferred to the eversion frame, which can be actuated as needed to ensure a complete eversion and correct placement of the garment on the frame.

Figure 17:
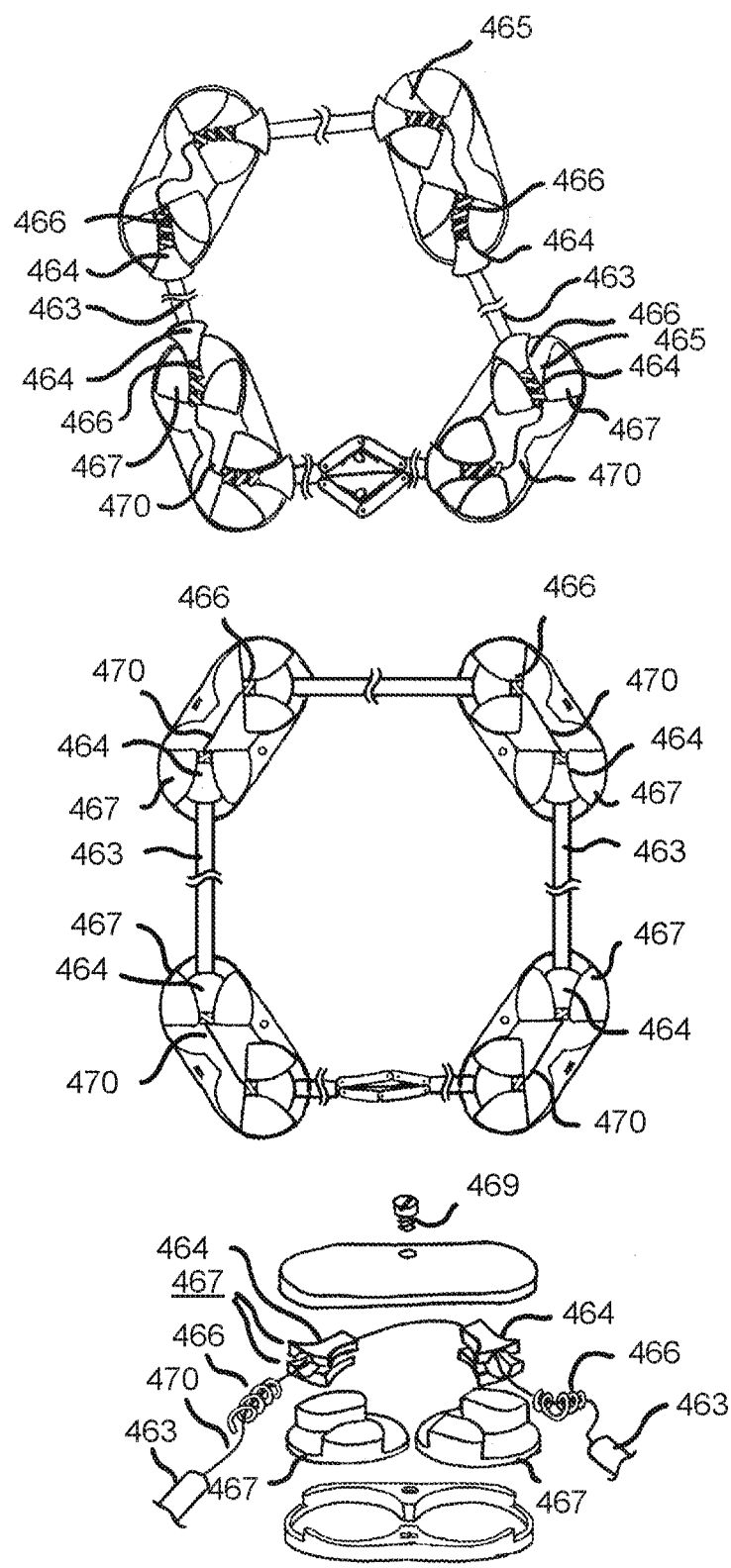
FIG. 17 depicts a collapsible eversion frame in accordance with one embodiment of the disclosed technology.

A collapsible, reconfigurable, eversion frame is depicted in FIG. 17. Telescoping segments 463 possess tapered tips 464 that mate with similarly tapered receptors 465. Biased springs 466 provide the ability to determine the default direction of the joint in the frame's collapsed 'slack state'. Rotary locking blocks 467, when compressed, lock the angle of the joint relative to the rest of the frame. The top of the joint mechanism includes a lip that acts against a fulcrum 468 to distribute the pressure exerted by a tension screw 469, which can be loosened to adjust any of the joints specifications, and tightened to 'lock' the position of the joint's components.

A tension line 470 runs throughout the frame, actuated by either the compression or decompression of the tension mechanism, depending on its configuration. If the line runs along the outside of the mechanism, compressing the mechanism decreases the tension in the frame, allowing it to go slack. If the line runs along the inside of the frame, compressing the tension mechanism increases the tension in the frame, causing it to become rigid.

Figure 18:
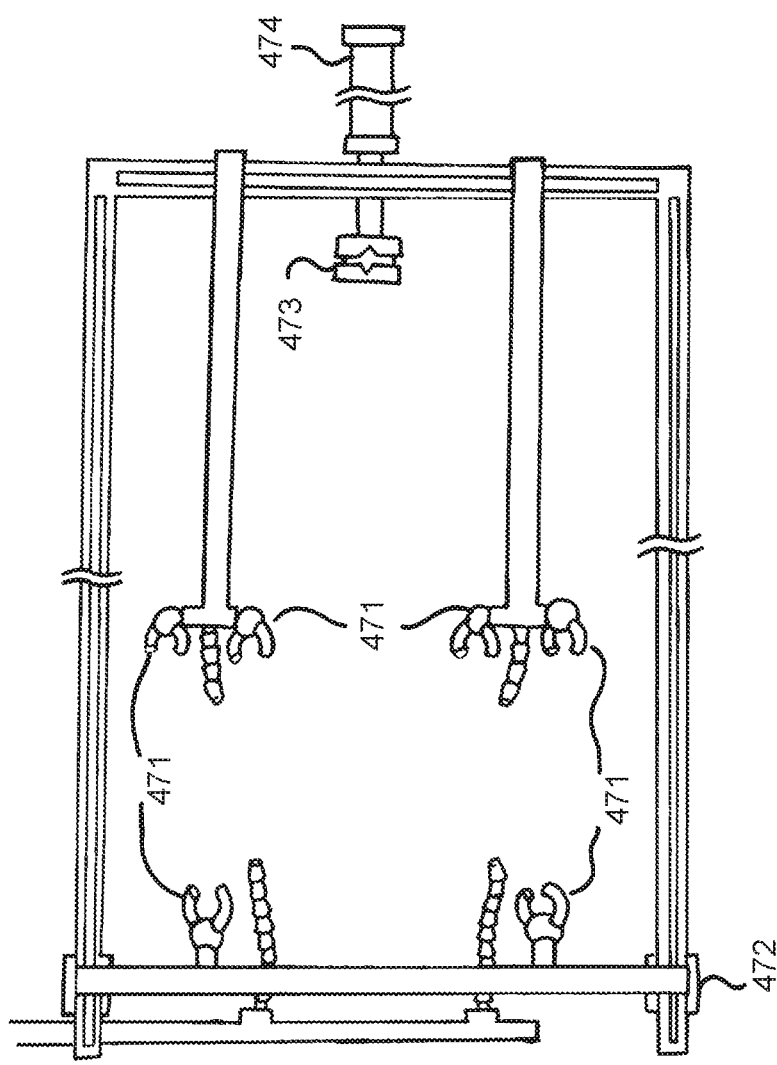
FIG. 18 depicts an eversion mechanism in accordance with one embodiment of the disclosed technology.

A mechanism to effect the final eversion is depicted in FIG. 18. Rotating grippers 471 are mounted on a sliding gantry that moves along tracks in the device 472. Positioned ducts direct jets of hot air to soften the posing agent. An actuated frame holder 473 holds the collapsible eversion frame in place during use, and a piston 474 is used to eject the garment and frame after eversion.

Figure 19:
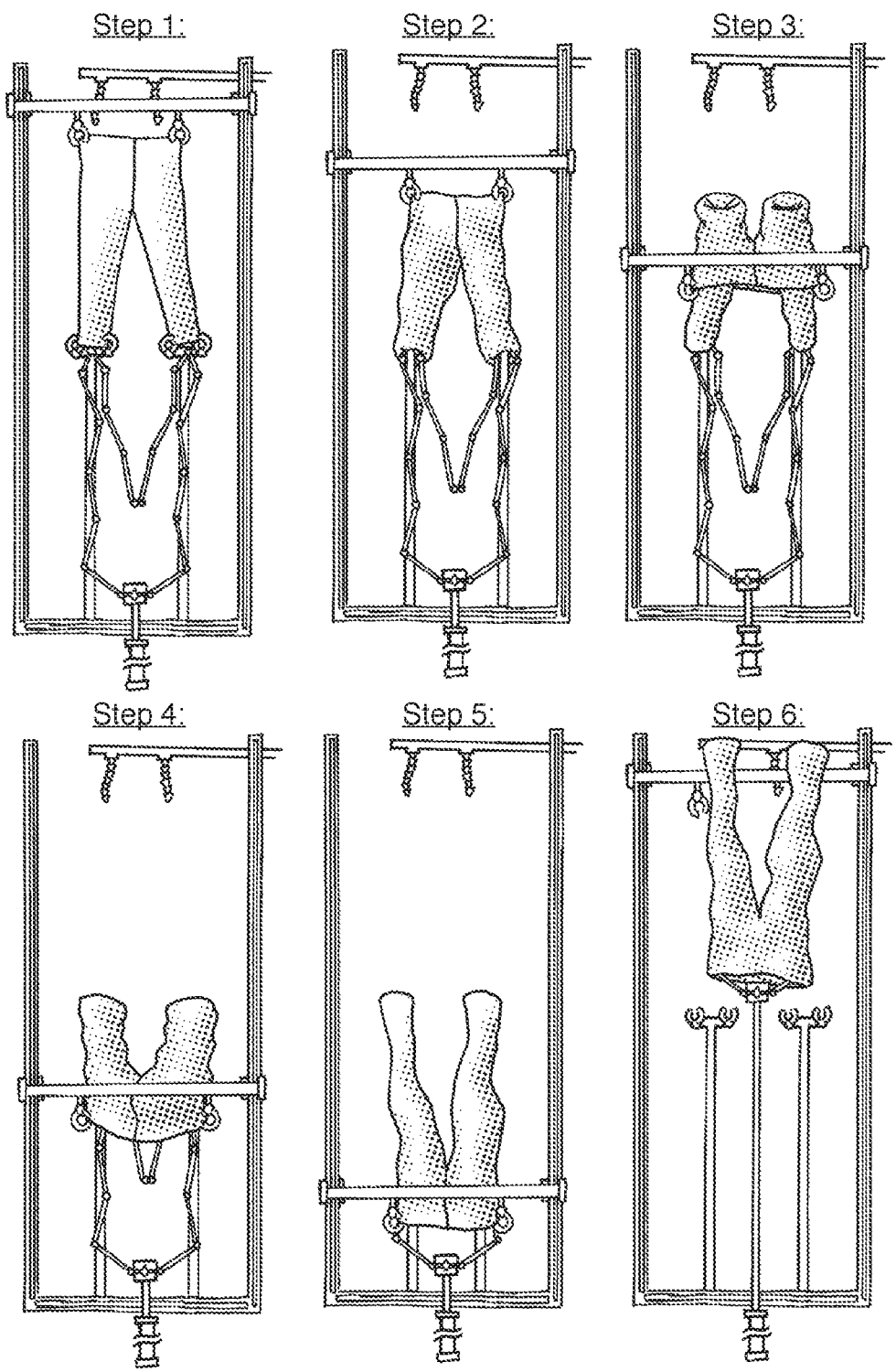
FIG. 19 depicts an example of a final eversion in accordance with one embodiment of the disclosed technology.

An example of a final eversion is depicted in FIG. 19. In Step 1, a garment is placed on an eversion machine. As the gantry moves the rotating gripping points along its path, the garment is pulled along and onto the frame, as seen in Steps 2-6. In Step 6, the eversion the frame is ejected, and then passed along to the washing phase.

Although demonstrated here in two dimensions, the eversion and drying/stretching frame could also be employed to achieve three-dimensional forms, with segments rotated off of the primary plane, including segments forking off into multiple axes. Separate frames used alongside each other in the same garment could be used for a similar effect.

Washing and Packaging

After the garment has been assembled, it is necessary to remove the posing agent. If the posing agent is water soluble, this can occur in conjunction with the washing step—if not, the agent must first be removed before the garment can be washed, most likely via exposure to an appropriate solvent or the modification of environmental conditions.

The garment stays on the frame throughout the washing process, and the same articulation mechanisms used to aid eversion can be used to tighten and slacken the frame during washing, allowing the water and/or solvent full access to all the garment's surfaces, and then apply tension to the textile during the drying phase and any subsequent surface treatment steps to prevent wrinkles and inconstancies in treatment.

After the garment has been washed and dried, the frame can be used to position the garment on a pressing device—either ejecting the garment onto it, or holding it in place during pressing. After the garment has been pressed, it can be deposited onto, or fed directly through to an automatic folding and packaging machine, which are already in general use.

Quality Control

Input Material Prep and Standardization

A high level of consistency in the input materials is required for a high level of consistency in finished products. This is desirable for many reasons related to professionalism and consumer preferences, but for the purposes of this process a high degree of consistency is particularly important for minimization of false negatives in downstream-automated quality assurance sensors. Even if slight variations in the finished product would be undetectable to consumers, they must still be minimized to allow for tighter tolerances when using automated quality assurance inspection techniques.

Depending on the source and starting consistency of the input materials, it may be necessary to standardize them prior to the main manufacturing processes. The manufacturing inputs that can or need to be standardized are the textiles, threads, and any additional components that are going to be assembled (zippers, buttons, etc.), the posing agent that's applied to the textile, and the water that's used to remove the posing agent and clean the final products after their assembly.

Thermoplastics are often produced and sold in a range of molecular weights/degree of polymerization and—in the case of Polyvinyl Alcohol (PVOH)—degrees of saponification and hydrolysis. (ZSchimmer & Schawrz GmbH & Co KG). These variations can affect the mechanical and chemical properties of the plastic—including, most importantly, the melting point and the rate of dissolution of the plastic—and should be analyzed to ensure that the plastic's properties fall within the expected ranges. Inconsistencies can be compensated for when possible, by varying the duration and temperature of the washing steps, otherwise the plastic must be discarded.

Textiles and thread introduced from external suppliers can vary slightly from batch to batch. Subtle variations in color and surface character between pieces of an assembled garment would be visually discordant and undesirable to consumers, so care must be taken to measure and note any variations in color or surface characteristics, resulting from slight differences in the bleaching, dyeing, or treatment of the material. If a large difference is detected, then attention should be given to ensure that pieces cut from that textile source are not joined with parts cut from dissimilar textiles, sorting and storing pieces accordingly.

The resting tension of textile is determined by the characteristics of the loom and the particulars of the process that's used to dry the textile after any subsequent dying and washing steps. If there are variations in the textiles' tensions, it may be necessary to re-wash and dry the incoming textile so they have the exact same tension. This will also ensure a standardized amount of shrinking after subsequent washing steps.

The solvent that's used to remove the posing agent after assembly should be analyzed to ensure purity and concentration. Care should be taken to minimize any contaminants that would interact with the garments being assembled, or diminish the quality of the recovered size, like mineral content or chemical contamination.

To maximize consistency during every manufacturing step, all input materials can be stored in a temperature and humidity controlled environment so their starting states will be consistent. The manufacturing environment can also be temperature and humidity controlled to preclude any variations in these attributes that may arise over time, with changes in season, weather, etc.

During traditional garment manufacture, the hands-on nature of the process allows workers to do quality control as they perform other assembly steps. In a fully automated assembly process, automated quality control becomes an important factor to maintain a standard level of quality during high-volume production.

Simple Quality Assessments

Relatively simple measurements can be interpreted to provide quality control information—a weight sensor can measure a finished or partially assembled garment and determine if the correct amount of textile is present, or if any buttons are missing. A sensitive enough scale can even determine if the correct amount of thread was used during assembly.

A moisture sensor can determine if the garment was sufficiently dried after the washing step.

A metal detector can check for any metal shavings or broken needles present in the garment, or if there were any metallic registration points that were not removed along with the posing agent.

A finished garment that fails any of these simple tests can be automatically ejected from the assembly line and passed along to operators for further inspection.

Complex Quality Assessments

More complex quality assessment techniques can be applied at various stages during production.

Raw Material Analysis

As discussed earlier in the description, it is important to identify flaws in the raw textiles, so that they're not passed along to cause quality control issues in finished garments. High-speed video cameras and inline scanners, coupled with machine vision systems, can locate defects such as tears or discoloration in the material. A strong backlight in visible or infrared wavelengths can be coupled with such a system to provide a measure of material integrity and consistency.

Scales and sensors can be used to determine if the textile possesses the required weight, thickness, elasticity, and density; and can thus provide an indicator of overall quality (or, at least, be used to indicate inconsistencies).

Intra Assembly Seam Inspection

Machine vision can be used to evaluate seams as and after they are created on a garment, either by analyzing the thread in the seam relative to the pieces it runs through, or the overall spatial relationship between the two pieces that are joined by the seam.

The relationship between the two pieces can be evaluated using commonly used digitization techniques: Machine vision along a seam can check for misalignment, while a laser scanner or digitizing probe can evaluate more subtle flaws in the specific shape of the assembled garment.

Thread inspection can be assisted if necessary by treating the thread with a UV-fluorescent dye and activating it for inspection.

Pre- and Post-Folding

Since the structural support provided by the posing agent can prevent flaws in the garment from being detected, an ideal time to evaluate the quality of an assembled garment is after it has been pressed and either before or after it has been folded.

Machine vision analysis of light reflected off the finished garment at a number of angles can provide useful information like the overall dimensions of a garment, the presence of seam quality issues like pucker, and the integrity and correct placement of any decorative or functional elements. If the thread has been treated to fluoresce under UV light, then that can be applied as well.

The internal structure of the garment can also be probed with an analysis of light in visible and non-visible wavelengths that are transmitted through the garment. This can be infrared or x-ray. If the sensor is of high-enough resolution, individual thread placement can be evaluated.

Also, as discussed earlier, utilizing machine vision for quality control is highly dependent on tight tolerances during assembly, and near-perfect consistency for post assembly steps like pressing and folding. If the variations in the (correctly assembled) garments' presentation to the Quality assessors are too severe, then they will produce false negatives and negate the utility of the quality control system.
Feedback Some assembly issues may occur due to unexpected causes like input material inconsistencies, environmental variations, and machine wear and tear. In an ideally automated environment, the quality control systems will detect these changes as they develop and compensate in real-time without additional intervention. If the detected flaws are outside of the system's ability to compensate, it will automatically pause assembly and alert an operator to the cause of the disruption.

If the quality control mechanism detects issues with seam characteristics, like pucker or too little tension in the threads, a feedback mechanism can send a signal to the sewing machine to adjust the tension and spacing of the threads in real-time to compensate.

Since the washing and drying stages are energy intensive, there will be efficiency incentives to minimize the time a garment spends in the washer and dryer. If too little time is spent, there may be a residue of the posing agent in the garments leaving the washing stage, or too much water left in the garments leaving the drying stage. Sensors can detect these issues by weight, optical characteristics, and moisture sensors and send signals to adjust the garments' washing and drying time accordingly.

If the system determines that the parts are misaligned, and can quantify the degree of misalignment, it can then feed that information back to the arm control systems to correct for the error.

Non- and Semi-Autonomous Implementations

Although this document has primarily been discussing its processes with regard to fully autonomous manufacturing operations, it's worth considering the benefits that posing-agent treatments can provide in the cases of only semi-autonomous and even fully manual garment manufacturing operations.

The same benefits of simplified handling and improved precision that facilitates automated machine handling of textiles would also be useful to a human worker, who could use posing agents to ease his task in a number of ways.

This can aid smaller-scale manufacturing operations, during the design process of garments, or for single-garment custom tailoring Limp fabrics, when treated and softened, could be wrapped around dress forms or models and sculpted while setting to attain the perfect shape and cut. Seams could be formed, and temporarily fastened with spot-welds in instead of the commonly used straight pins. This eliminates both the time required to insert the pin, and the risk of leaving the pin in the garment and accidentally pricking a customer. Although the final sewing operations would be done by hand, the task is simplified by the fixed positioning of the pieces relative to each other.

In the case of using this technique during the design and development process for larger production runs, instead of sewing the finished garment can then be washed, so that the pieces become separated, and then laid down and traced or scanned to create a pattern for forming duplicate garments.

Additionally, it's worth considering a scenario in which garments that are too complex for fully-automated manufacture are partially manufactured by automated processes and then handed over—either with or without posing agent—to human workers for the required operation—and then, if the process requires it and the posing agent is still present on the garment, handed back to the machine for further work. If the posing agent has been removed, then the garment can be handled by machines requiring a greater degree of operator guidance and intervention than those used while the posing agent was present.

EXAMPLES

To assemble, as an example, a pair of pants, the first step is to fuse the textiles with the posing agent.

After it's been added to the textile, the posing agent can then be textured as needed, by compressing it under an embossing cylinder. Next, any functional surface features (gripping and registration points, etc.) are added to the roll by a pick and place mechanism and welding apparatus.

After the posing agent and surface features have been added, the garment pieces can be separated from the textile with a plotter or rolling die cutter. They're collected, sorted, and fed through to the assembly line.

Any pieces cut from alternate textiles, like linings or interfacings, can be prepared simultaneously or separately.

A robot grasps a large piece, comprising one of the pants legs, and places it onto the work area. The robot, or secondary robots, then place any additional pieces that need to be attached to the first piece, and can be attached while flat. This would include a pocket, an elastic band, a label, etc. After placing each piece, a spot-welding mechanism melts their interface with the posing agent and temporarily fixes them in place.

The robot then moves the piece through sewing machines to permanently join the added components. At this time, the robot finishes any necessary edges by feeding them through overlock sewing machines or sewing machines equipped with folding guides.

A robot then lifts the piece and positions it adjacent to a vacuum-equipped cutting surface so that any loose threads can be trimmed.

The robot then transports the piece to a forming machine, which heats, deforms, and cools the piece so that it acquires the desired shape. The deformed piece is then removed from the forming machine and folded, along its existing crease line, against itself.

A complementary piece, the other pant leg, is then mated with the first piece. Their seams are temporarily tacked by spot welders, and then are joined permanently by sewing machines. The immediately accessible seams are sewn first, and then inaccessible seams are made available, and sewn up, by articulating the appropriate segments of their assembly jig. The assembled garment is then placed atop au eversion mechanism, opposite to an eversion frame. The eversion mechanism's grips hold the garment at its extremities. Directed nozzles soften the posing agent with an application of hot air. The gantry mechanism pulls the garment's top down over the eversion frame, until it has been turned completely inside out and is containing the frame. The frame, and garment on it, are ejected from the eversion mechanism and picked up by a conveyor that moves the garment through its washing and drying cycles so that the posing agent is fully removed. During the washing cycle, the eversion frame is slackened so that the garment is somewhat free to mingle with the solvent, but during the drying phase the frame is tense so as to pull the garment tight and minimize wrinkles. The washed and dried garment is pulled off of the eversion frame by rollers, and is passed through a quality inspection station. If the garment checks out, it is then deposited onto a folding and packaging machine.

Conclusion

The systems, substrates, workpieces, and methods of treatment can be used to manufacture items. Systems, components, and techniques for reducing subcutaneous adipose tissue are disclosed in U.S. Provisional Patent Application No. 62/442,295; U.S. Provisional Patent Application No. 62/590,932; and U.S. patent application Ser. No. 14/652,436 the disclosures of which are incorporated herein by reference in their entireties. It will be appreciated that some well-known structures or functions may not be shown or described in detail so as to avoid unnecessarily obscuring the relevant description of the various embodiments. Although some embodiments may be within the scope of the technology, they may not be described in detail with respect to the figures. Furthermore, features, structures, or characteristics of various embodiments may be combined in any suitable manner. The technology disclosed herein can be used for to perform other methods.

Any patents, applications and other references, including any that may be listed in accompanying filing papers, are incorporated herein by reference. Aspects of the described technology can be modified, if necessary, to employ the systems, functions, and concepts of the various references described above to provide yet further embodiments. While the above description details certain embodiments and describes the best mode contemplated, no matter how detailed, various changes can be made. Implementation details may vary considerably, while still being encompassed by the technology disclosed herein. The various aspects and embodiments disclosed herein are for purposes of illustration and are not intended to be limiting, with the true scope and spirit being indicated by the following claims.

What is claimed is:

1. A method for manufacturing a garment, the method comprising:
    applying one or more stiffening treatment films to a flexible material to form a stiffened material by:
        feeding, by a first roller assembly, the one or more stiffening treatment films to a third roller assembly;
        rolling, by a second roller assembly, the flexible material to the third roller assembly;

compressing, via the third roller assembly, the one or more stiffening treatment films and the flexible material to form a multilayer workpiece; and applying a solvent to the one or more stiffening treatment films to partially dissolve the one or more stiffening treatment films and to form a stiffened material from the multilayer workpiece;

robotically transporting the stiffened material to a garment assembly workstation;

robotically coupling the stiffened material to another piece of material to form at least a portion of a garment; and removing substantially all of the one or more stiffening treatment films from the stiffened material.

2. The method of claim 1, wherein the garment includes a plurality of textile pieces, the method further comprises robotically sewing together a portion of the textile pieces while the textile pieces are temporarily stiffened.

3. The method of claim 1, further comprising forming a portion of the garment while the flexible material is stiffened by the one or more stiffening treatment films.

4. The method of claim 1, wherein the removal of substantially all of the one or more stiffening treatment films is performed by at least one of:

spraying an additional solvent onto the one or more stiffening treatment films;

rolling the additional solvent onto the one or more stiffening treatment films; or dipping the one or more stiffening treatment films into a bath of the additional solvent.

5. The method of claim 1, further comprising coupling together one or more pieces of the stiffened material to form a portion of a garment.

6. A method for manufacturing a garment, the method comprising:

applying one or more stiffening treatment films to a flexible material to form a stiffened material by:

feeding, by a first roller assembly, the one or more stiffening treatment films to a third roller assembly;

rolling, by a second roller assembly, the flexible material to the third roller assembly;

applying a solvent to the one or more treatment film to partially dissolve the one or more stiffening treatment films;

compressing, via the third roller assembly, the one or more partially dissolved stiffening treatment films and the flexible material to form a multilayer workpiece; and removing the solvent from the multilayer workpiece to form a stiffened multilayer workpiece; and robotically transporting the stiffened multilayer workpiece to a garment assembly workstation;

robotically coupling the stiffened multilayer workpiece to another piece of material to form at least a portion of a garment; and removing substantially all of the one or more partially dissolved stiffening treatment films from the stiffened multilayer workpiece.

7. The method of claim 6, wherein removing the solvent includes evaporating the solvent from the composite workpiece.

* * * * *